United States Patent [19]
Rich

[11] Patent Number: 6,108,460
[45] Date of Patent: *Aug. 22, 2000

[54] LOAD BALANCED IMAGE GENERATION

[75] Inventor: Henry H. Rich, Raleigh, N.C.

[73] Assignee: PixelFusion Limited, Bristol, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/661,028

[22] Filed: Jun. 10, 1996

Related U.S. Application Data

[60] Provisional application No. 08/582,085, Jan. 2, 1996.

[51] Int. Cl.[7] .............. G06K 9/36; G06K 9/54; H04N 1/40; G06F 9/00
[52] U.S. Cl. .............. 382/304; 382/276; 382/302; 345/418; 345/505; 358/448; 395/675
[58] Field of Search .............. 382/302, 276, 382/304; 358/448, 515; 395/675; 345/153, 418, 430, 431, 505, 509, 514

[56] References Cited

U.S. PATENT DOCUMENTS

| | | | |
|---|---|---|---|
| 4,586,038 | 4/1986 | Sims et al. | 345/430 |
| 4,590,465 | 5/1986 | Fuchs | 345/418 |
| 4,692,880 | 9/1987 | Merz et al. | 345/430 |
| 4,727,365 | 2/1988 | Bunker et al. | 345/139 |
| 4,783,649 | 11/1988 | Fuchs et al. | 345/509 |
| 4,827,445 | 5/1989 | Fuchs | 345/514 |
| 4,905,164 | 2/1990 | Chandler et al. | 345/431 |
| 4,965,745 | 10/1990 | Economy et al. | 345/431 |
| 5,363,475 | 11/1994 | Baker et al. | 345/422 |
| 5,388,206 | 2/1995 | Poulton et al. | 345/505 |
| 5,396,346 | 3/1995 | Nakayama et al. | 358/448 |
| 5,455,600 | 10/1995 | Friedman et al. | 345/153 |
| 5,481,669 | 1/1996 | Poulton et al. | 345/505 |
| 5,546,530 | 8/1996 | Grimaud et al. | 345/502 |
| 5,630,129 | 5/1997 | Wheat | 395/675 |
| 5,808,617 | 9/1998 | Kenworthy et al. | 345/421 |

FOREIGN PATENT DOCUMENTS

| | | | |
|---|---|---|---|
| WO 92/09947 | 6/1992 | WIPO | G06F 2/14 |

OTHER PUBLICATIONS

Williams, Lance, *Pyramidal Parametrics*, Computer Graphics, vol. 17, No. 3, pp. 1–11 (Jul. 1983).

Fuchs et al., Fast Spheres, Shadows, Textures, Transparencies, and Image Enhancements in Pixel–Planes, *Association for Computing Machinery's SIGGRAPH '85*, pp. 111–120.

*Primary Examiner*—Phuoc Tran
*Assistant Examiner*—Daniel G. Mariam
*Attorney, Agent, or Firm*—Burns, Doane, Swecker & Mathis, L.L.P.

[57] ABSTRACT

Methods, apparatus and program products provide load balancing in a paralell processing image generation system. In an image generation system for generating pixel values of a pixel array which corresponds to a group of geometric primitives which define a computer generated image where the image generation system includes a plurality of processing elements which are assigned to a specified pixel of the pixel array. The specification of pixels to processing elements is carried out to balance the processing load of the plurality of processing elements. Regions of the pixel array may be associated with subsets of the plurality of processing elements. A linear expression evaluator then provides region specific coefficients to the subsets of the plurality of processing elements. The plurality of processing elements may also be divided into a plurality of panels. The pixels are then associated with one of the plurality of panels and the linear expression evaluator provides region specific coefficients to the processing elements of the panel associated with the region. The regions may be further divided into a plurality of subregions with at least one pixel from each of the plurality of subregions assigned to each of the processing elements.

28 Claims, 24 Drawing Sheets

Fig. 16A
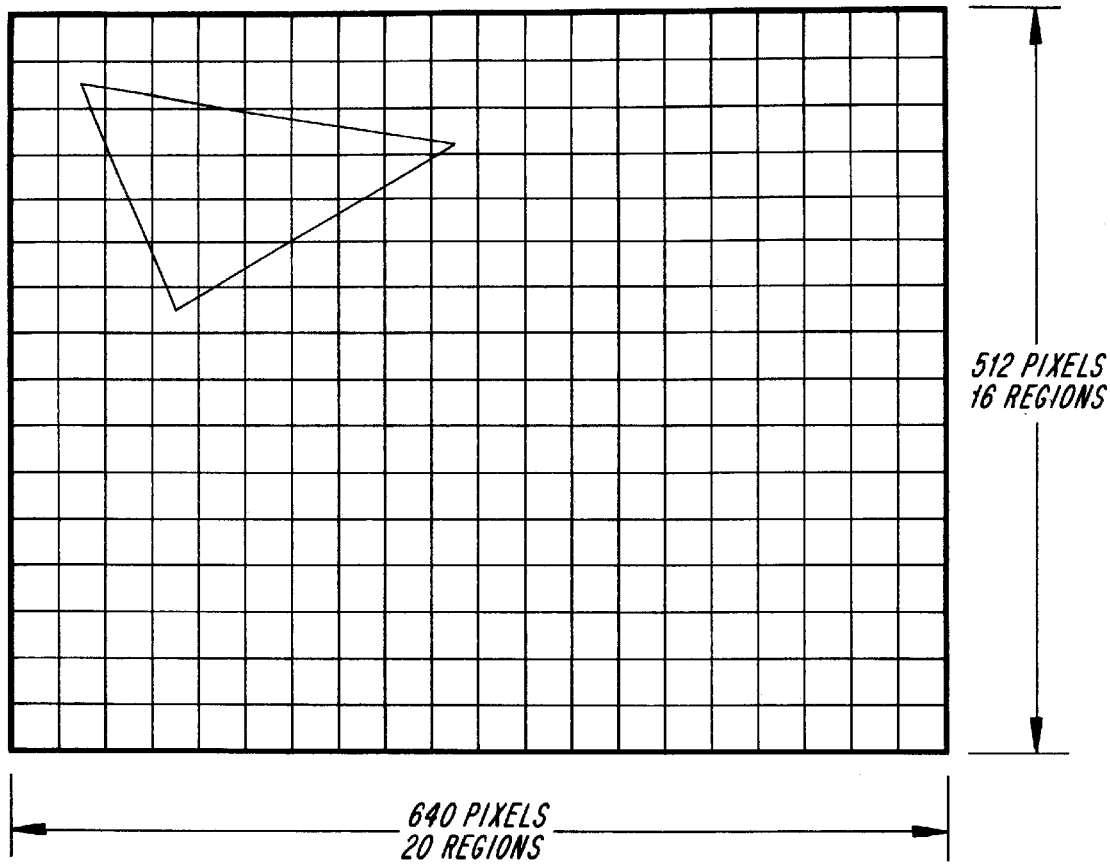
512 PIXELS
16 REGIONS
640 PIXELS
20 REGIONS
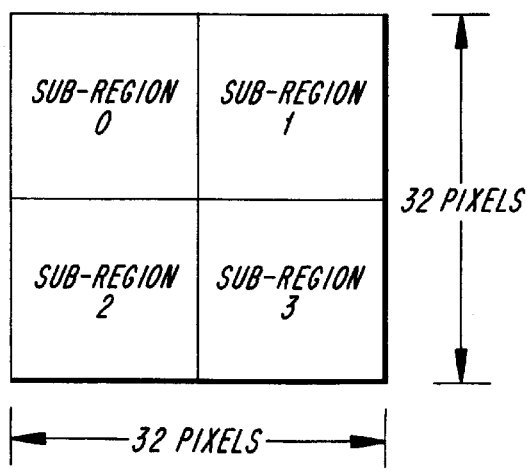
Fig. 16B

| 0 | 32 | 1 | 33 | 2 | 34 | 3 | 35 | 4 | 36 | 5 | 37 | 6 | 38 | 7 | 39 |
|---|---|---|---|---|---|---|---|---|---|---|---|---|---|---|---|
| 64 | 96 | 65 | 97 | 66 | 98 | 67 | 99 | 68 | 100 | 69 | 101 | 70 | 102 | 71 | 103 |
| 128 | 160 | 129 | 161 | 130 | 162 | 131 | 163 | 132 | 164 | 133 | 165 | 134 | 166 | 135 | 167 |
| 192 | 224 | 193 | 225 | 194 | 226 | 195 | 227 | 196 | 228 | 197 | 229 | 198 | 230 | 199 | 231 |
| 8 | 40 | 9 | 41 | 10 | 42 | 11 | 43 | 12 | 44 | 13 | 45 | 14 | 46 | 15 | 47 |
| 72 | 104 | 73 | 105 | 74 | 106 | 75 | 107 | 76 | 108 | 77 | 109 | 78 | 110 | 79 | 111 |
| 136 | 168 | 137 | 169 | 138 | 170 | 139 | 171 | 140 | 172 | 141 | 173 | 142 | 174 | 143 | 175 |
| 200 | 232 | 201 | 233 | 202 | 234 | 203 | 235 | 204 | 236 | 205 | 237 | 206 | 238 | 207 | 239 |
| 16 | 48 | 17 | 49 | 18 | 50 | 19 | 51 | 20 | 52 | 21 | 53 | 22 | 54 | 23 | 55 |
| 80 | 112 | 81 | 113 | 82 | 114 | 83 | 115 | 84 | 116 | 85 | 117 | 86 | 118 | 87 | 119 |
| 144 | 176 | 145 | 177 | 146 | 178 | 147 | 179 | 148 | 180 | 149 | 181 | 150 | 182 | 151 | 183 |
| 208 | 240 | 209 | 241 | 210 | 242 | 211 | 243 | 212 | 244 | 213 | 245 | 214 | 246 | 215 | 247 |
| 24 | 56 | 25 | 57 | 26 | 58 | 27 | 59 | 28 | 60 | 29 | 61 | 30 | 62 | 31 | 63 |
| 88 | 120 | 89 | 121 | 90 | 122 | 91 | 123 | 92 | 124 | 93 | 125 | 94 | 126 | 95 | 127 |
| 152 | 184 | 153 | 185 | 154 | 186 | 155 | 187 | 156 | 188 | 157 | 189 | 158 | 190 | 159 | 191 |
| 216 | 248 | 217 | 249 | 218 | 250 | 219 | 251 | 220 | 252 | 221 | 253 | 222 | 254 | 223 | 255 |

Fig. 16C

LOAD BALANCED IMAGE GENERATION

RELATED APPLICATIONS

This application is related to and claims priority from U.S. patent application Ser. No. 08/582,085 entitled "Method and Apparatus for Texturing Computer Graphic Images" filed Jan. 2, 1996 which has been converted to Provisional Application Ser. No. 60/032,799.

FIELD OF THE INVENTION

The present invention relates to data processing systems and more particularly to image generation systems, methods and computer program products.

BACKGROUND OF THE INVENTION

The rapidly increasing commercial importance of efficient, real-time generation of high resolution graphics images and scenes from digital data bases has sparked a significant amount of work in the areas of graphics display processor and frame buffer device architecture and in developing faster linear expression evaluation techniques.

Many of the computational tasking performed in conventional raster-scan graphics systems, aside from texturing, includes determining the relationship of a point (typically representing a pixel or a sub-pixel) to a specific line as defined in a two or three dimensional space. These linear expression evaluations are typically conducted by generating a mathematical definition of a particular line in the form of Ax+By+C and inserting a selected coordinate pair of x, y point or pixel values into the linear expression as so defined.

Increases in the efficiency and speed of evaluating linear expressions of the form mentioned above, therefore, offer the potential to significantly shorten the time required to develop and prepare digitally generated images and scene frames for presentation in real-time on a graphics screen display.

Conventional raster scan graphics display systems typically support the NTSC standard frame generation rate of thirty frames per second. Real-time digital scene generators are thus, in general, limited to less than one thirtieth of a second to compute and prepare the content of each successive frame. As a 512 by 512 pixel display screen requires that information for over 250 thousand pixels be provided in each frame, usually at the NTSC rate of thirty frames per second as in conventional quality video systems, improvements in the speed of frame generation, and reductions in the cost of high speed frame generation, are of fundamental value to manufacturers of electronic products and systems intended for application in the fields of electronic media based entertainment, multimedia and virtual reality.

Conventional techniques for creating a graphics frame scene include accessing one or more digitally stored objects from a data base library. These stored objects essentially are mathematical models that are defined in data bases as individual sets of planar polygons. These planar polygons are typically further defined by sets of vertices located in a three dimensional space.

The image of an object in a particular scene is determined by the stored mathematical model of the object, the position of the object within the environment of a particular frame, the hypothetical viewing position of an observer, and a selected field of view. The three latter parameters are typically set by an interactive applications program.

Generated images are then clipped to either conform with a specified field of view or as a result of processing constraints. The clipping process may create more edges and the need for significantly more computational work later in the conventional art.

The image is then scaled for perspective and integrated into a full digital scene frame. Transformation of polygon vertices coordinates into screen coordinates and sorting out occlusion effects typically are accomplished during the integration of an image into the full scene.

Coloring, shading and texturing computations for each pixel are carried out at various steps within the conventional art process of most real time digital scene generation systems.

The computational operations used to determine distances, surfaces, shading, lighting, coordinate transformations and texture coordinates are essentially linear expression evaluations. In fact, and as mentioned previously, much of the computational load of a real time digital scene generator aside from texturing primarily involves linear expression evaluation.

An article by Henry Fuchs et al., published in the Association for Computing Machinery's SIGGRAPH '85, pp. 111–120, entitled "Fast Spheres, Shadows, Textures, Transparencies, and Image Enhancements in Pixel-Planes" discloses a logic-enhanced memory system architecture designed for raster graphics imaging systems. This specialized digital circuit architecture, specifically identified as Pixel-Planes, provides logic-enhanced memory chips as elements of the frame buffer. These logic-enhanced memory chips store scanned out images and perform pixel level calculations. A binary tree of one bit adders efficiently computes a given linear expression for the x and y of every pixel of the screen display.

A frame buffer memory chip designed in accordance with the Pixel-Planes concept comprises a unified multiplier tree connected to a multiplicity of pixel dedicated, logic enhanced memory segments. Each of these memory segments is made up of a one bit arithmetic logic unit (ALU), a one bit Enable register, and a set allotment of memory bits, perhaps 32 or 72. Each memory segment is dedicated to a particular pixel within a region. The region lay-out, and permanent assignment of individual memory segments to pixel locations within a region, is defined by the memory device architecture (i.e. individually and permanently hard-wired.)

The Pixel-Planes concept provides for a translator circuit which receives polygon vertex coordinates from a transformation engine board. The translator circuit converts the vertex coordinates into the A, B, and C coefficients of a linear expression, where the an x1, y1 coordinate pair of a vertex v1, and an x2, y2 coordinate pair of a vertex v2 yield an A coefficient equal to y1 minus y2, a B coefficient equal to x2 minus x1, and a C value equal to the product of x1 and y2, less the product of x2 and y1.

The value of the calculation of the resultant Ax+By+C equation is positive for a given pixel if and only if the pixel is on the same side of the line as the polygon surface. In the Pixel-Planes operating technique, all Enable registers are set to a "1" value at the initiation of each individual polygon examination. Should a pixel fall outside of any edge of the polygon under examination, that pixel's corresponding Enable register is changed to a "0" value.

The Pixel-Planes technique divides a full frame into a series of regions. A two dimensionally assigned stack of logic-enhanced memory segments (i.e. a hardware set includes a one bit ALU, a one bit Enable register, and a strip of memory) sequentially process each region of a particular frame.

The logic-enhanced memory segments are assigned within a region to a permanent x, y coordinate value pair. This permanent assignment of x, y values to a logic-enhanced memory segment, and the relative isolation of a logic-enhanced memory segment, especially in being restricted to drawing only upon its' own computing resources during most of its' operations, may limit optimal application of the total computing power of the Pixel-Planes hardware to efficiently process the numerous contribution layers of a typical frame preparation.

Further developments of Pixel-Planes concepts have led to the issuance of two patents of note to Henry Fuchs, of the Computer Science Department of the University of North Carolina, and another related patent to Henry Fuchs and John W. Poulton of Durham, N.C. U.S. Pat. No. 4,590,465, issued to Henry Fuchs on May 20, 1986, discloses a raster scan type graphics system that permits simultaneous calculations at every pixel in a polygon. Multiplier trees generate values for every Ax, By and C for every value of x and y in the pixel matrix. The x, y coordinates are defined within this patent as being the coordinates of the pixel within the image, and are permanently assigned to a logic-enhanced memory segment, as described in the SIGGRAPH '85 article discussed above. A special purpose computer is required to generate the Ax, By and C values.

U.S. Pat. No. 4,783,649, issued to Henry Fuchs and John W. Poulton on Nov. 8, 1988, discloses a graphics display image buffer which is supportive of economical implementation of the Pixel-Planes concept as embodied in U.S. Pat. No. 4,590,465 and as mentioned above. The apparatus of this later patent comprises the combination of the x and y multiplier trees, which are then connected to a conventional IC memory grid design. Each output of the x-y multiplier tree is available to the pixel dedicated logic enhanced memory segments.

U.S. Pat. No. 4,827,445, issued to Henry Fuchs on May 2, 1989, discloses an alternative image buffer comprising logic-enhanced pixel memory cells. A processor at each cell, as envisioned in this patent, performs pixel color and other values for the polygons. Memory cells are presented in this patent as being in direct correspondence to one specific pixel (within a sequentially moving region) of the screen.

In reference to all three patents described above, the Pixel-Planes design and processing concepts limit logic-enhanced memory segments/cells to receiving computing support only from a multiplier tree or trees, but to otherwise function without further resources beyond individual segment/cell computing capabilities.

Two patents issued to Poulton et al., U.S. Pat. Nos. 5,388,206 and 5,481,669, also relate to image generation through use of a plurality of processing elements. The Poulton et al. image generation system utilized a composition network which interconnected a number of rendering and shading and texturing devices.

While the above systems and methods distributed the image generation across a number of logic enhance memory devices or processors, these systems may still have processing bottlenecks based upon the distribution of primitives within a screen.

SUMMARY OF THE INVENTION

In view of the above, it is an object of the present invention to allow for more efficient use of processing resources in an image generation system.

It is a further object of the present invention to reduce the computational bottlenecks which can arise in distributed processing systems.

An additional object of the present invention is to allow for flexibility in use of an array of processing elements.

The present invention provides apparatus, methods and computer program products to efficiently generate images for display on a display device utilizing a plurality of parallel processing elements. Certain aspects of the present invention involve grouping processing elements of a processing element array into processing units. These processing units, or panels, comprise an internal bus structure that enables the grouped processing elements to share computing and data storage resources among themselves during computational tasking. Each processing element may perform a calculation for an x, y coordinate pair value that has been assigned by the over-all system design to any other processing element within the panel. This capability to load share reduces the potential for, and degree of, computational bottlenecking.

Alternate preferred embodiments of the present invention further comprise the assignment of multiple x, y values to a particular processing element as "home pixels". This multiple assignment permits a given processing element to be flexibly assigned during the processing of a particular polygon, and to process certain polygons of sufficiently small magnitude with improved efficiency.

Thus, a particular embodiment of the present invention provides an image generation system for generating pixel values of a pixel array which corresponds to a group of geometric primitives which define a computer generated image. The image generation system includes a plurality of processing elements which are assigned to a specified pixel of the pixel array. This specification of pixels to processing elements is carried out to balance the processing load of the plurality of processing elements.

In an embodiment of the present invention wherein the mathematical expressions comprise linear expressions, the image generation system includes a linear expression evaluator associated with the plurality of processing elements for providing coefficients of linear expressions corresponding to the geometric primitives of an image to the plurality of processing elements.

In an alternate embodiment of the present invention, an image generation system associates regions of the pixel array to subsets of the plurality of processing elements. The linear expression evaluator then provides region specific coefficients to the subsets of the plurality of processing elements. In a further refinement, the plurality of processing elements is divided into a plurality of panels. The pixels are then associated to a respective one of the plurality of panels and the linear expression evaluator provides region specific coefficients to the processing elements of the respective panel associated with the region. The regions may be further divided into a plurality of subregions with at least one pixel from each of the plurality of subregions assigned to each of the processing elements. The linear expression evaluator may also evaluate the mathematical expression to generate a region base value for the regions and provide this calculated region base value to the processing elements associated with a given region.

Also provided are alternative methods of generating a computer image utilizing a plurality of processing elements in a processing element array. In these methods, home pixel addresses are assigned to the processing elements of the processing array. The processing element array then determines which home pixel addresses of the processing elements correspond to pixels of the screen which are inside a region defined by the geometric primitives which define the image such that a contribution value for the geometric primitive will result for the home pixels which are associated with the geometric primitives. Geometric primitives are then distributed to the processing elements of the processing element array such that each of the processing elements provides one contribution value for a home pixel based on the geometric primitive assigned.

In one embodiment of the present inventions determination of which pixels reside within a primitive and the distributing of primitives to the processing elements is repeated until one of the conditions selected from the group comprising the condition of a geometric primitive being distributed to each processing element in the processing element array and the condition of at least one processing element in the processing element array being unable to accept a further primitive is satisfied.

In a further embodiment of the methods, contribution values for each home pixel based upon the geometric primitives are determined and returned to the processing element associated with the home pixel. A final contribution value for each home pixel is generated from the contribution values returned for the home pixel.

In a further embodiment, contribution values are discarded if a contribution value for a home pixel associated with a geometric primitive will be obscured by a nearer geometric primitive.

Preferably, home pixels are assigned to each of the processing elements such that the home pixels of each processing element correspond to non-adjacent pixels of the screen.

By providing a processing system which allows for the distribution of processing functions througout the processing element array, the processing system may reduce the likelihood that specific processing elements with multiple data to process will prevent the remaining processing elements in the array from processing additional data. Furthermore, by allowing each processor to be responsible for more than one pixel value in a processing element array the likelihood of idle processing elements is further reduced. Also, by assigning pixel address values to the processing elements in the processing element array in a non-adjacent manner such that adjacent processing elements are not assigned adjacent pixels, the processing load for generating images is also dispersed throughout the processing element array. Accordingly, these techniques reduce the bottlenecking problems associated with previouse image generation systems and provide for the efficient generation of images.

As will be appreciated by those of skill in this art, the above described aspects of the present invention may also be provided as apparatus, data processing system or computer program product.

BRIEF DESCRIPTION OF THE DRAWINGS

FIG. 16A is a diagram of a screen having 640×512 pixels;

FIG. 16B is a diagram of region assignments of the screen of FIG. 16A for one embodiment of the image generation system of FIG. 1;

FIG. 16C is a diagram of processing element assignments of the regions of FIG. 16B;

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods, data processing systems (apparatus) or computer program products. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including semiconductor devices, hard disks, CD-ROMs, optical storage devices, or magnetic storage devices.

Overview of the System

Figure 1:
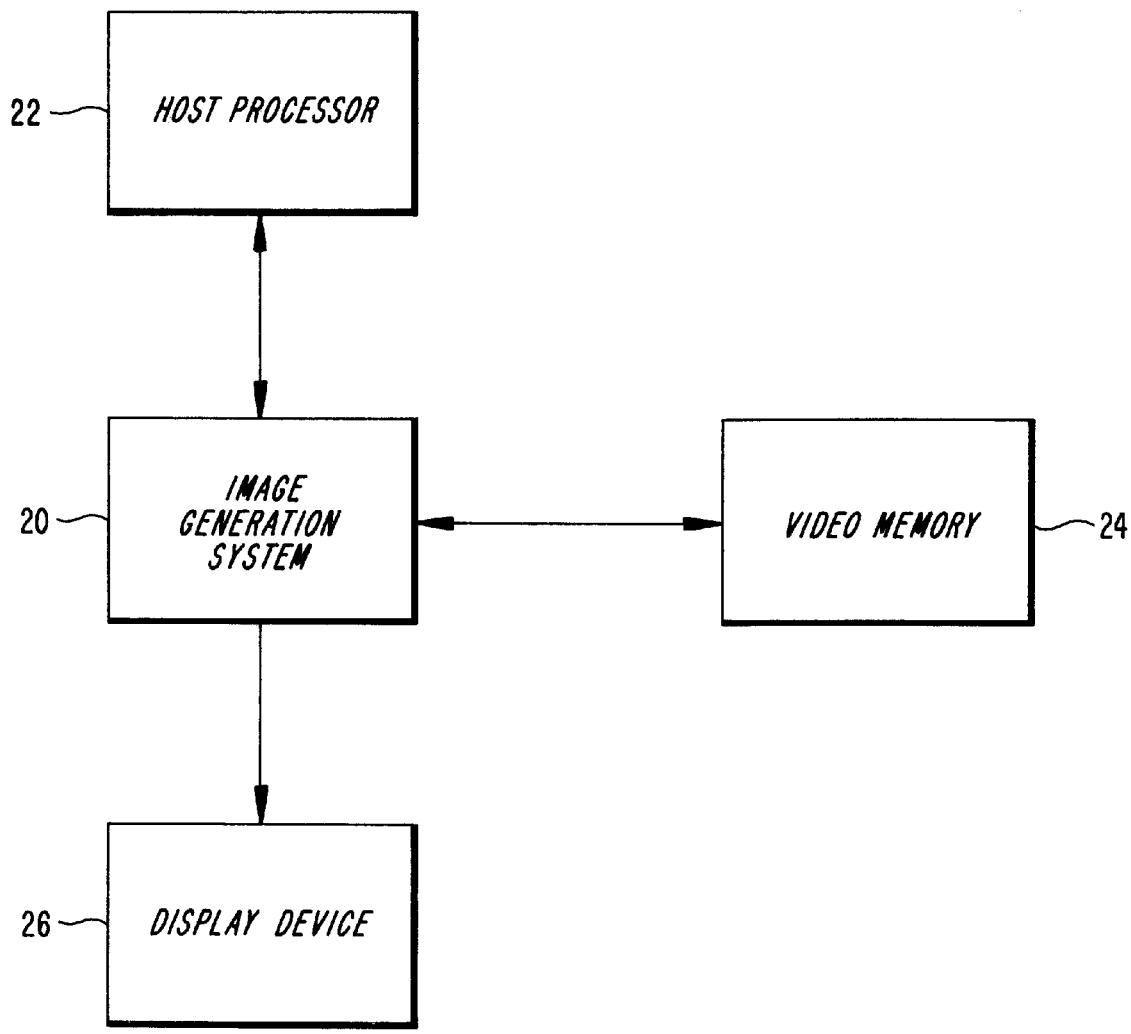
FIG. 1 is a block diagram of a processing system utilizing an image generation system of the present inventions.

FIG. 1 illustrates one aspect of the present invention. As seen in FIG. 1, an integrated image generation system 20 communicates with a host processor 22, video memory 24 and a display device 26. The integrated image generation system 20 receives information from the host processor 22 from which the image generation system 20 generates an image to be displayed on the display device 26.

In one implementation of the present invention, a software model of objects to be displayed is created within the host processor 22. An object is a two or three dimensional software model of a thing that is to be displayed. Objects may be composed of polygons, which are portions of planes defined by three or more vertices in a three dimensional coordinate system. An object model may include polygons that define the surfaces of the objects, as well as texture patterns that appear ultimately on the polygon surfaces.

The polygons of the object models may be defined in a three-dimensional space, often called "world" or "model" coordinates, and texture patterns or "texture maps" are defined in a two-dimensional space for each pattern, often called u-v space.

The object models are referenced by a program running in the host processor 22 that determines the appropriate orientation and immediate view to be displayed at any given instant in a dynamic image generation sequence. The image generation system 20 receives or obtains models generated by the host processor 22 and operates on those models to create an array of picture elements or "pixels" which are in two-dimensional space referred to as "x-y space" or "screen coordinates." The term x, y space refers to a two dimensional coordinate system laid out in direct relationship to the pixel pattern of a video display screen. This x-y representation of the models provided to the image generation system 20 is what is displayed on the display device 26 as a graphical image. The display device 26 displays the graphical image which is composed as a screen. A screen is a physical collection of pixels organized in a two dimensional grid corresponding to the x-y space. A frame is a complete set of information required to provide a screen with enough data to present visual information.

In one aspect of the present invention, the image generation system 20 is provided with object models by a controlling process executing in the host processor 22 (by hardware or a combination of hardware and software) which selects object models as necessary, and provides a list of objects to the image generation system 20 which may scale the objects, perform perspective transformations of each model into the x-y coordinate system corresponding to the screen coordinates of pixels and render the objects into a pixel image for display on the display device 26. Whatever the operations which are performed on the objects provided to the image generation system 20, the ultimate result is an array of values corresponding to the pixels of the display device 26 such that the values define visible characteristics of each pixel to be displayed. Thus, the information to be displayed by the display device 26 may be viewed as a pixel array or array of pixels with pixel values for each element of the array which are determined by the image generation system 20 based on the models provided by the host processor 22.

The Image Generation System

Figure 2:
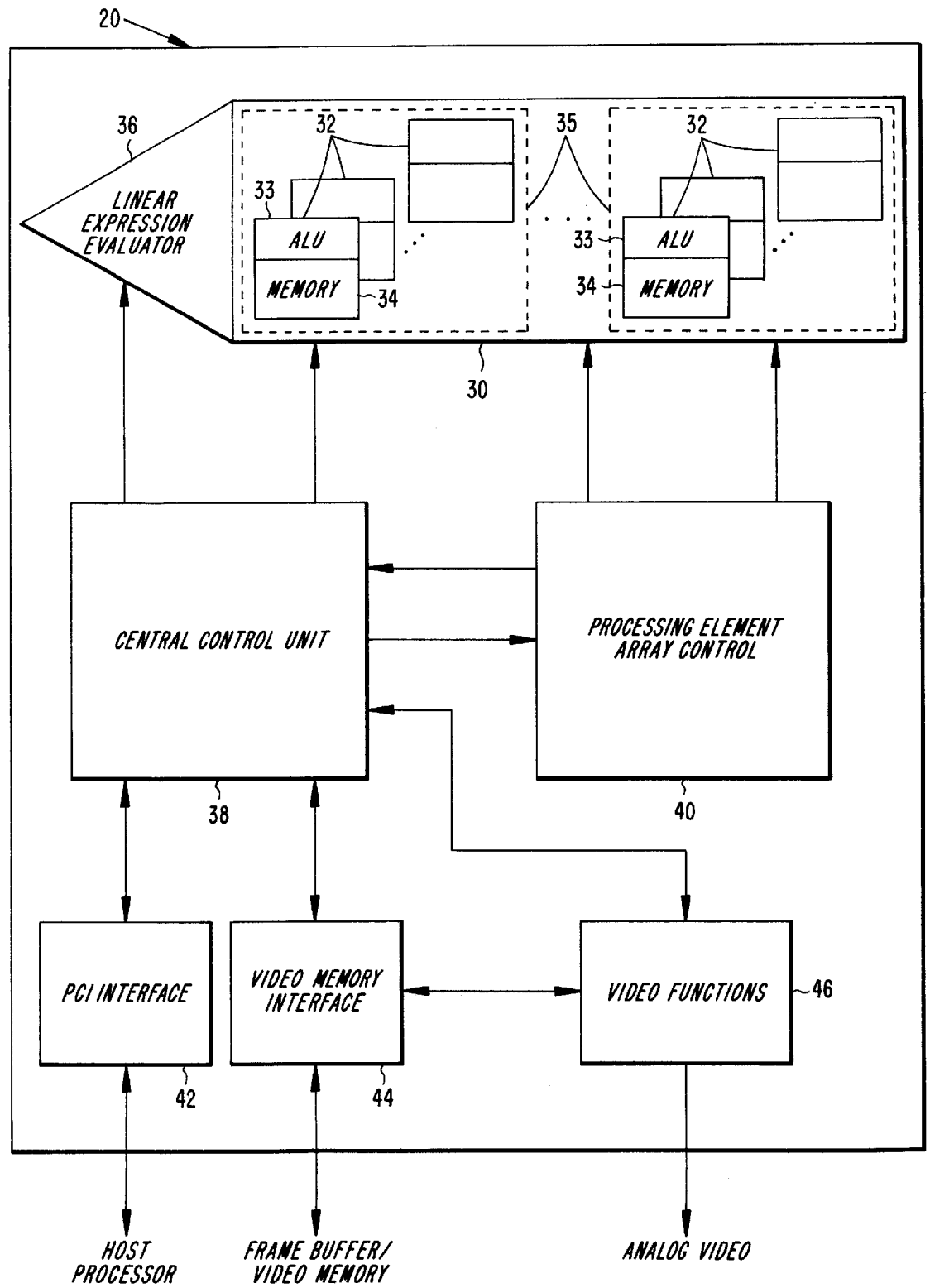
FIG. 2 is a block diagram of an image generation system of the image generation system of FIG. 1.

FIG. 2 illustrates one embodiment of an image generation system of the present invention. As seen in FIG. 2, the image generation system 20 includes a plurality of processing elements 32 which make up a processing element array 30. These processing elements 32 operate as a single instruction, multiple data (SIMD) processing array. A SIMD processing array is a computing device in which the same processing instruction is supplied to multiple individual processors, but each processor operates on a different data stream.

In one embodiment of the present invention, the processing element array 30 comprises 256 separate processing elements 32 operating nominally as a single instruction, multiple data configuration. Each processing element 32 comprises an 8 bit, multifunction arithmetic logic unit ("ALU") 33, directly coupled to its own bank of 128 bytes of memory 34. Each ALU is capable of simultaneously accessing its own memory and can share data with its neighbors via an interconnecting bus structure.

The SIMD processing element array 30 receives its instruction from the processing element array control unit 40 and data from the linear expression evaluator 36. The linear expression evaluator 36 is a device which enables each processing element 32 in the processing element array 30 to simultaneously evaluate an expression of the form $Ax+By+C$, where A, B and C are constants for the whole processing element array 30 and x and y are variables as a function of processing element 32. The linear expression evaluator 36 is normally used in 3D graphics operations, where x and y are screen space Cartesian coordinates for pixel locations and each processing element 32 is assigned to a separate pixel.

The processing element array element control unit 40 is primarily responsible for sequencing instructions and addresses to the processing element array 30. The operations are programmable and determined by a set of microinstructions held locally in random access memory ("RAM") and read only memory ("ROM"). The processing element array control unit 40 also provides data processing operations to support the processing element array 30. Global data flow to and from the array 30 is handled by the processing element array control unit 40 by generating requests for system resources to the central control unit 38.

The processing element array 30 may also receive data from, or provide data to, the central control unit 38. The central control unit ("CCU") 38 manages the overall operation of the device and performs data flow buffering and control between the various resources. It accepts and arbitrates requests from the various resources. The CCU contains a programmable, micro-coded processor (the Management Central Processing Unit ("mCPU")) which executes micro-instructions contained in local RAM and ROM. Decoding hardware may also reside within the management mCPU to assist decompression operations with run-length and entropy decoding.

The image generation system 20 interfaces with the host processor 22 through the PCI Interface 42. The PCI interface 42 allows for bi-directional communication between the host processor 22 and the central control unit 38. The PCI interface 42 supports DMA transfers and is responsible for all data communication with the host processor's processing resources. The image generation system 20 also communicates with a video memory 24 which may function as a frame buffer where image frames are constructed. The communication between the image generation system 20 and the video memory 24 is controlled by the video memory interface 44. The video memory interface 44 also communicates with the central control unit 38 and the video functions 46 of the image generation system 20.

The video functions 46 generate an analog video signal which may be displayed by the display device 26. Video functions 46 may encompass the tasks of: Video timing and control; VGA compatibility; CRT screen refresh; and hardware acceleration of operations such as interpolated zoom and color space conversion. Inputs to the video functions 46 are predominantly, pixel data from the external frame buffer. The main output is analog, RGB video to the display device 26.

As illustrated in FIG. 2, the processing elements 32 are divided into a plurality of groups. These groups are referred to herein as a panel 35. A panel 35 is defined as a group of processing elements that share an internal data bus structure. A subpanel is a subset of the memory and bus resources of processing elements of a given panel. One arrangement of the present invention has panels of thirty-two processing elements with each panel having four subpanels with each subpanel having a connection to one of the four 8 bit panel buses and to 32 bytes of memory.

The processing elements 32 are related to the x-y space of the screen through the use of home pixels. A home pixel is a specific physical pixel on a computer display screen. Each processing element is assigned to a set of unique and individual pixels in the screen coordinates. The home pixels of a given processing element, therefore, includes specific pixels that are refreshed periodically by the contents of that processing element. In the operation of the present invention, processing elements are used as computational and memory management resources beyond their assignment as determiners of frame by frame home pixel values.

Operation of the Image Generation System

In operation, the image generation system 20 receives instructions from the host processor 22 via the PCI interface 42. These instructions may take many forms including pointers to blocks of data and instructions to be carried out by the image generation system 20. The manner in which the data is provided to the image generation system 20 by the host processor 22 may be dependent on the type of operation which the image generation system is requested to perform.

Figure 3:
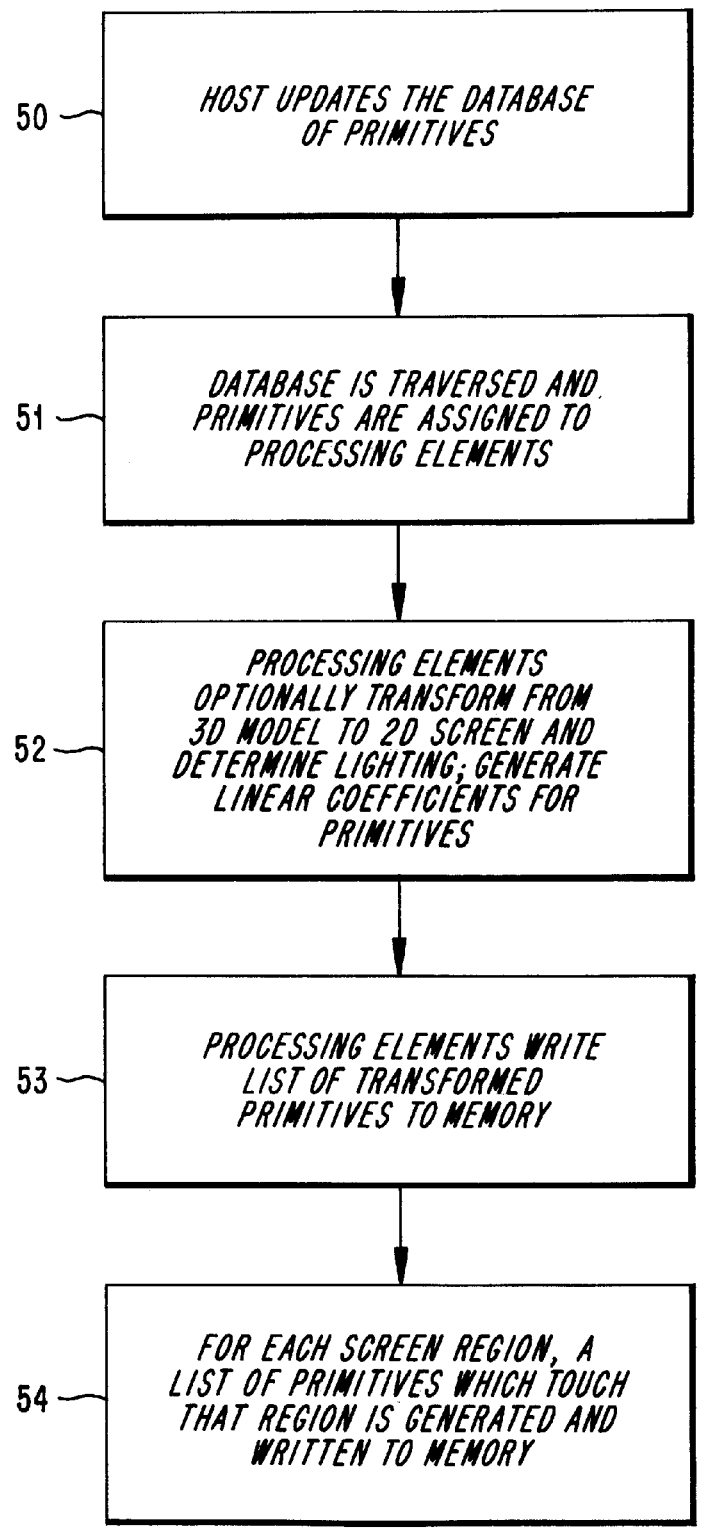
FIG. 3 is a flow chart of geometry processing aspects of the image generation system of FIG. 1.
Figure 4:
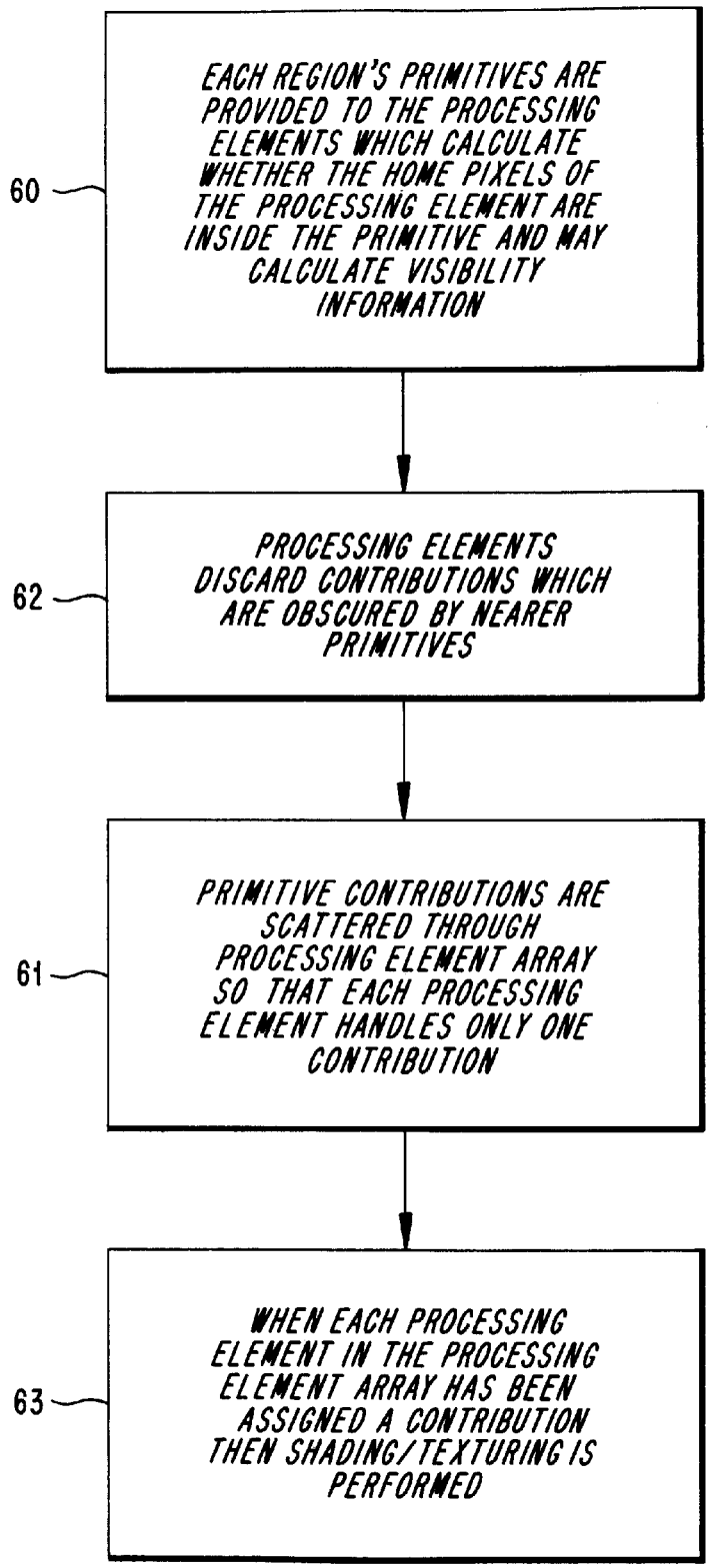
FIG. 4 is a flow chart of rasterization aspects of the image generation system of FIG. 1.
Figure 5:
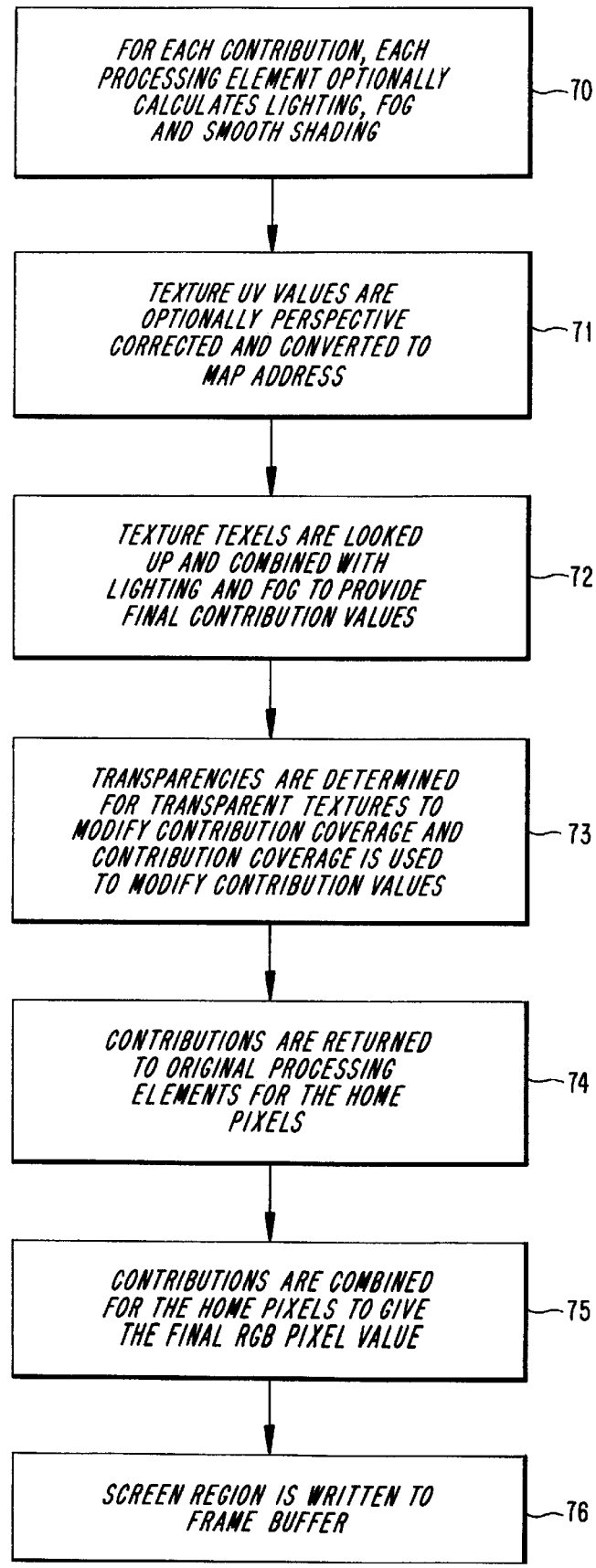
FIG. 5 is a flow chart of texturing and composition aspects of the image generation system of FIG. 1.

FIGS. 3, 4 and 5 illustrate the functions which may be carried out by an image generation system according to the present invention. In the embodiment of the present invention illustrated in FIGS. 3, 4, and 5, a database of model elements which comprise the screen image to be generated is constructed by the host processor in model coordinates. The image generation system then carries out four functions to convert the model in the database to an image in the frame buffer. These four functions are geometric processing, rasterization, shading/texturing and composition. Each of these functions will be described below. As will be appreciated by those of skill in the art, other systems of defining components of screen images may also be utilized. Furthermore, other functions in generating screen images may be carried out by the present image generation system.

The first function carried out by one particular embodiment of the image generation system is illustrated in FIG. 3. After the host processor 22 updates a database of primitives which define the image to be generated, as reflected in block 50, the image generation system traverses the database of primitives and assigns the primitives to processing elements of the processing element array 30. The database may be loaded in video memory by access through the PCI interface 42 through the central control unit 38 and out the video memory interface 44. Alternatively, the database may reside in memory accessible through the host processor 22 or locally accessible. The traversal of the database is reflected in block 51 of FIG. 3 and may be carried out by providing the model data from the video memory through the video memory interface 44 to the central control unit 38 to the processing element array 30. The geometry processing instructions are provided to the processing element array 30 by the processing element array control unit 40. The processing elements 32 may then optionally transform the primitives defined in model space to x, y space on screen coordinates. The details of one method of this transformation are described below, however, any suitable method may be utilized. The processing elements 32 may also determine the lighting values for the primitive and generate the linear coefficients of the primitives. These operations are shown in block 52.

After each of the desired operations reflected in block 52 have been carried out, the processing elements 32 write the list of transformed primitives to external memory as seen in block 53. This operation involves extracting the data from the processing element array 30 through the central control unit 38 and out the video memory interface 44 or alternatively, the PCI Interface 42. Because the screen is divided into a number of regions, a list for each region is generated which lists the primitives which touch that region. This list is written to external memory as seen in block 54. Once all of the lists specifying which primitives touch which screen regions are written to memory, the geometry processing function of the image generation system is complete.

After geometry processing, the next function carried out by the image generation system is rasterization. As seen in FIG. 4, rasterization begins by providing each region's primitives to the processing elements 32. The processing elements 32 calculate whether the home pixels of the processing element 32 are inside the primitive and may calculate visibility information, as seen in block 60. Visibility information may include such things as z information in a z-buffered system, depth information, subpixel coverage or other methods of determining the visibility of a pixel known to those of skill in the art. The operations reflected in block 60 are performed by providing to the processing element array 30 the linear expression coefficients of the primitives determined in block 52 through the linear expression evaluator 36. The instructions for the processing element array 30 are provided by the processing element array control unit 40 and are sequenced by the central control unit 38 to align with the linear expression coefficients provided to the linear expression evaluator 36 by the central control unit 38. The resultant masks are then saved to memory 34. The processing elements 32 discard contributions which are obscured by nearer primitives as seen in block 62. As used herein, the term contributions refers to information associated with a pixel which allows for the determination of a contribution value. A final pixel value is then created by a combination of contribution values associated with a given pixel. The remaining primitive contributions are then optionally scattered through the processing element array 30 so that each processing element 32 only handles one contribution as seen in block 61. When each processing element 32 of the processing element array 30 has been assigned a contribution, then the shading/texturing function is performed as reflected in block 63.

FIG. 5 illustrates the shading/texturing and composition functions of the image generation system. Once each processing element 32 has been assigned a contribution as seen in block 63 then, for each assigned contribution each processing element 32 optionally calculates one or all of lighting, fog and smooth shading values as seen in block 70. Texture u, v values are then generated by the processing elements 32 and perspective corrected if required as shown in block 71. These u, v values are also converted to MAP addresses as reflected in block 71. Texture texels are then looked up by reading the texture maps from memory through the video memory interface 44 or PCI Interface 42 and distributing the texture maps to the appropriate processing elements 32 through the central control unit 38. These texture maps are combined with lighting, fog and shading contributions to provide final contribution values as seen in block 72. The texturing aspects of one embodiment of the present image generation system are described in detail below.

Block 73 illustrates the next function, which is to determine if transparencies modify the contribution coverage. If the texture is transparent then the contribution coverage is modified and this modified contribution coverage is utilized to modify the contribution values. After transparency determination, contributions are returned to the original processing elements for the home pixels to which they relate as seen in block 74. In an alternative embodiment, the transparency calculation of block 73 is delayed until the composition function of block 75 described below.

The composition function begins in block 75 where contribution values are combined for the home pixels in the processing elements 32 to give the final RGB pixel value. These final pixel values are written to the frame buffer from the processing element array 30 through the central control unit 38 and the video memory interface 44 for each screen region as shown in block 76. This completes the image generation function for a particular database of models. The frame buffer then is used to display the RGB pixel values on a display device.

Figure 4A:
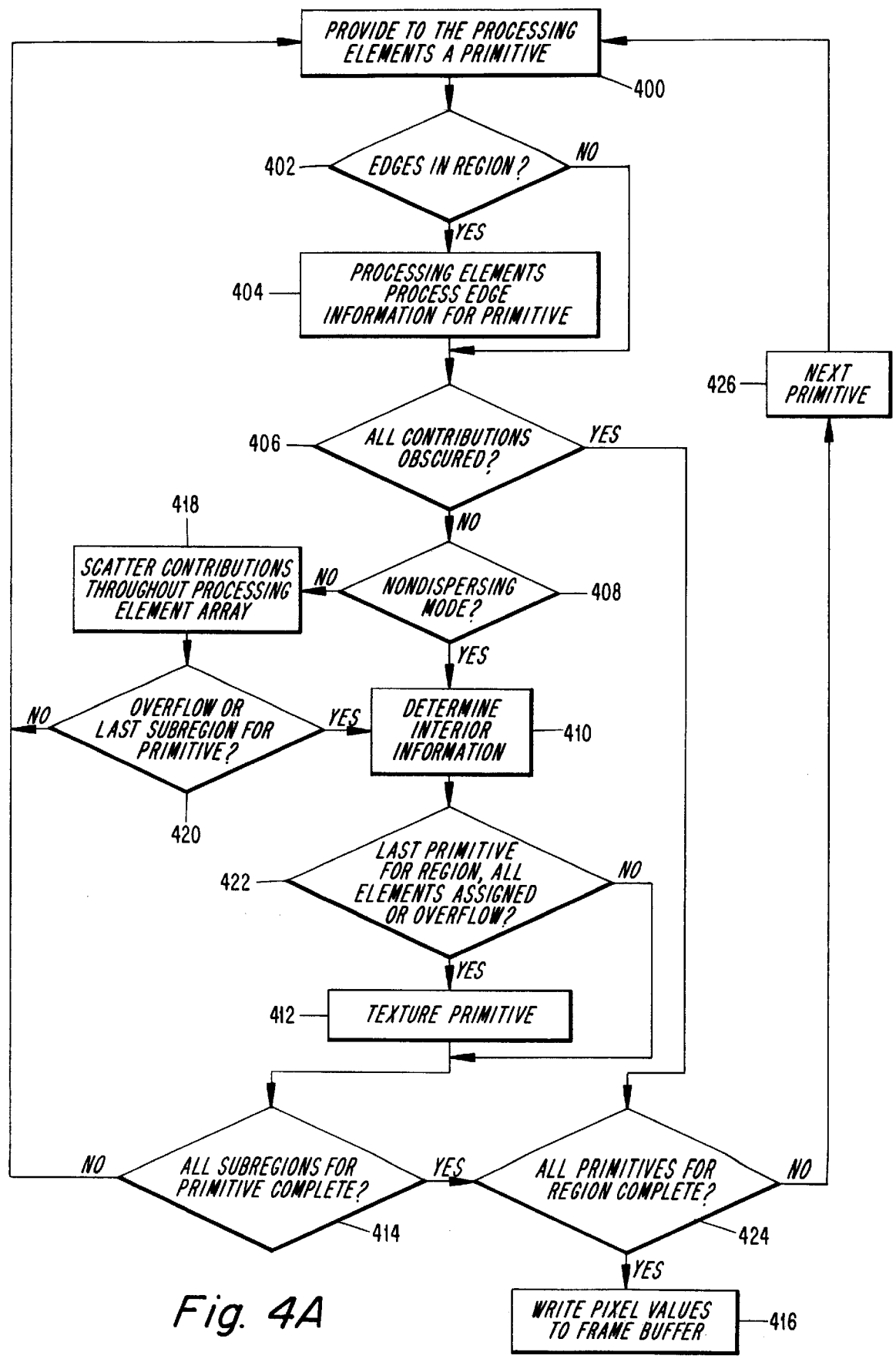
FIG. 4A is a flow chart of an alternative embodiment of the present image generation system utilizing non-dispersion.

FIG. 4A illustrates an alternate embodiment of the present invention. The blocks of FIG. 4A replace blocks 60 through 63 of FIG. 4 and blocks 70 through 76 of FIG. 5. As seen in block 400 of FIG. 4A, the processing elements 32 are provided with a geometric primitive. If the primitive provided has no edges in the region being processed by the processing element array 30 then, as reflected in block 402, all pixels of the region are within the primitive and edge information need not be processed. Thus, block 404 is bypassed. If edges are present in the region, then the processing elements process the edge information for the primitive as reflected in block 404. This edge evaluation may simply create the mask indicating which x, y values are within the primitive, which form the edge and which are outside the primitive.

If the processing elements 32 determine that all the contributions for the primitive being processed are obscured, then the primitive does not require further processing. If more primitives are in the region then another primitive may be provided to the processing elements 32, as reflected in blocks 406, 424, 426 and 400. As will be appreciated by those of skill in the art, if the processing element array 30 determines at any time that a primitive is obscured, then additional processing need not be performed on that primitive. Accordingly, while the flow chart of FIG. 4A illustrates the determination of whether the contribution is obscured as a sequential operation, this operation may be interrupt driven such that whenever it is determined that the primitive is obscured processing of that primitive could be curtailed.

Each primitive has associated with it an indicator of whether dispersal through the processing element array 30 is required for that primitive. For example, if a primitive does not have a transparent texture and if anti-aliasing is not required for the primitive, then a primitive need not be dispersed through the processing element array 30 but may simply be processed by the home pixel processing elements 32 for the primitive. This "nondispersing mode" may be set for each primitive or for a group of primitives depending upon the application. If nondispersing mode is not set then the image generation system of the present invention proceeds as described above and scatters the contributions of the primitive throughout the processing element array as seen in blocks 408 and 418.

Because more than one pixel value within a region may be assigned as the home pixel for a processing element 32 the regions may be divided into subregions. Each processing element 32 is assigned only one home pixel from each subregion. Because a primitive may have an interior which requires a contribution from more than one home pixel for a particular processing element 32 it may be necessary to repeatedly provide to the processing elements 32 the primitive for a region. Thus, in the present case where there are 4 home pixels assigned to each processing element it may be necessary to provide a primitive to the processing element array 30 4 times if one processing element has a contribution for all 4 of its home pixels. In such a case the primitive is evaluated a subregion at a time. If, however, the primitive does not require a processing element 32 of the processing element array 30 to provide a contribution for more than one of its home pixels then the primitive may be provided to the array 30 only once. Accordingly, the primitive need only be provided to the processing element array 30 equal to the largest number of contributions that a single processing element 32 in the array 30 must determine based on the processing elements home pixel values.

If one processing element 32 of the processing element array 30 has filled its overflow memory area or if no more subregions of the region are required to determine the contributions for the primitive, then the processing elements 32 determine the interior information as described above and reflected in blocks 420 and 410. If none of the processing elements 32 of the processing element array 30 has filled its overflow memory area and if more subregions must be provided to the processing element array 30 to calculate the contributions in a region for a primitive, then, the primitive is again provided to the processing element array 30, as reflected in blocks 420 and 400.

If the primitive provided to the processing element array 30 has associated with it an indicator that it is nondispersing, then the path of blocks 418 and 420 is not taken from block 408 and the contributions are not scattered throughout the processing element array 30, but remain in the processing elements 32 of the home pixels. These home pixel processing elements 32 then determine the interior information for the primitive as seen in block 410.

If the primitive is the last primitive for a region, if all of the processing elements have been assigned a contribution or if one of the processing elements has filled its overflow memory area then the primitive is textured as described above with respect to blocks 72 and 73 of FIG. 5 and reflected in blocks 422 and 412. The return of the pixel contribution values to the processing element assigned the home pixel corresponding to the pixel contribution values will depend on whether the primitives required dispersal such that the contribution values would need to be returned to the home pixel processing elements 32. If such is the case then the contribution values are returned as described above. If no dispersal is required then the contributions remain resident in the home pixel processing elements 32 and need not be returned. Any combination of returned or non-returned contribution values may be utilized for a given region.

As seen in block 414 if all the subregions required for a primitive have been processed, then, as reflected in block 424, it is determined if all of the primitives for a region have been processed. If all of the subregions of a primitive have not been processed then, as seen in block 400, the primitive is provided to the processing element array 30 again and the process is repeated. However, if all of the subregions have been processed but all of the primitives for a region have not been processed, then as reflected in blocks 424, 426 and 400, the next primitive for the region is provided to the processing element array 32. If all of the primitives for a region have been processed, then as seen in blocks 424 and 416, the pixel values are written to the frame buffer.

Figure 6:
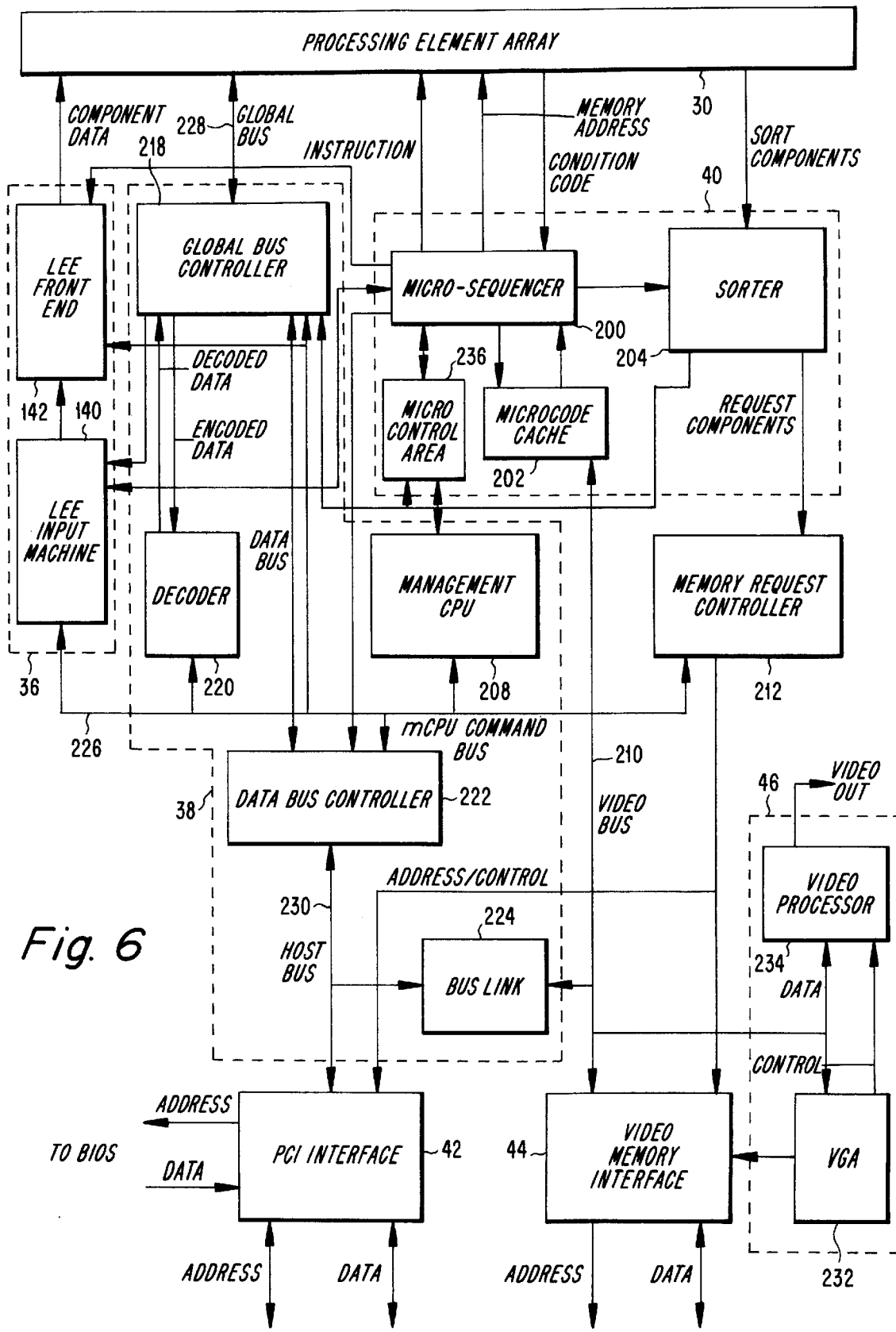
FIG. 6 is a block diagram of one embodiment of the image generation system of FIG. 1.

While the present image generation system has been described generally above, a specific single chip embodiment of the present invention is illustrated in block diagram form in FIG. 6. In the image generation system of FIG. 6, the five major component groups described above are illustrated in further detail. These component groups included the Processing Element Array 30, the PE Array Control Unit 40, the Linear Expression Evaluator Unit 36, the Central Control Unit 38 and the Auxiliary Modules 42, 44 and 46.

As seen in FIG. 6, the heart of the system is the Processing Element Array 30 (PEA) which is made up of 256 Processing Elements 32 (PE) that operate in parallel from a single instruction stream. Each PE has its own memory resource and a bus structure which allows for sharing of data between processing elements 32.

The PEA 30 interfaces with the PE Array Control Unit 40 which provides sequence control and sorting of external data requests. The major components of the PE Array Control Unit 40 are the Micro-Sequencer 200 (uSEQ), the Microcode Cache 202 (uCC), the Sort Controller 204 (SRT) and the Micro Communication Area 236. The Micro-Sequencer 200 is responsible for generating the Instruction Word and the Memory Address for the PEA 30. The USEQ 200 also receives Condition Code flags from the PEA 30 which are used in determining the next Microcode Address for the uCC 202. The Micro Sequencer 200 communicates with the Management CPU 208 through the Micro Communication Area 236. The Microcode Cache 202 provides the uSEQ 200 with microcode data based on the generated address. The uCC 202 is loaded with microcode instructions through the Video Bus 210. The Sort Controller 204 provides sorting of memory requests from the PEA 30. The SRT 204 will receive sort components produced by the processing elements 32 and provides data to the Micro Sequencer 200 through the Micro Communication Area 236 and the Global Bus Controller 218 and generates request components to the Memory Request Controller 212.

The Linear Expression Evaluator Unit 36 is formed by the LEE Input Machine (LIM) 140 and the LEE Front End (LFE) 142, and supplies support for evaluating the expression Ax+By+C where A,B,C are the coefficient constants and (x,y) is the pixel address. The LEE Input Machine 140 is responsible for receiving coefficient data from the Global Bus Controller 218 and generating formatted coefficient data suitable for the LEE Front End 142. The LEE Input Machine 140 also receives control and data from the Micro Sequencer 200. The LEE Front End 142 is responsible for generating the intermediate LEE component data based on the formatted coefficients, to be used by the PEA 30 in generating the final LEE results and receives data from the mCPU Command Bus 226 and control from the Micro Sequencer 200.

As described above, the Central Control Unit 38 (CCU) supplies general control of data flow through the system and processing of compressed data formats. The major components of the central control unit 38 are the Management CPU 208 (mCPU), the Decoder 220 (DEC), the Global Bus Controller 218 (GBC), the Data Bus Controller 222 (DBC), the Memory Request Controller 212 (MRC) and the Bus Link 224 (BL). The Management CPU 208 is the central control module which provides control information for the operation of the DEC 220, GBC 218, DBC 222, MRC 212, LIM 140 and LFE 142. The mCPU 208 uses the mCPU Command Bus 226 to provide command sequences to the different modules as well as receiving commands and data from the host. The Global Bus Controller 218 controls the flow of data through the Global Bus 228 which is used to communicate such data as compressed and decompressed texture maps to and from the PEA 30. The GBC 218 also provides an interface for the DEC 220 for decoding encoded data and an interface to the LFE 142 for supplying the coefficient data. The Data Bus Controller 222 stores the data and controls the flow of data through the Data Bus 240 which is used to communicate such data as the geometry definition packets to the GBC. On the other side of the DBC 222 is the Host Bus 230 which is used to transfer data such as mCPU command blocks, texture maps and pixel information. The Memory Request Controller 212 is used to generate address and control information for accessing the external resources through either the PCI 42 or Video Memory 44 Interfaces. The Decoder 220 is responsible for decoding the entropy encoded data supplied by the GBC 218. The resultant decoded data from the DEC 220 is written back out to the GBC 218. Finally, the Bus Link 224 module manages the flow of the data between the Host Bus 230 and Video Bus 210. It is controlled by the arbiters of the two buses, the PCI 42 and VMI 44 Interfaces. The transfer path through the bus link 224 is used to download texture maps to the video memory 24 from the host processor 22, transfer texture data from video memory 24 to the DBC 222, write the pixel data generated by the PEA 30 to the video frame buffer memory 24 or download microcode from external memory to the uCC 202.

The Auxiliary Modules provide special hardware acceleration of video functions as well as interfaces to the systems external resources. The major components are the PCI Interface (PCI) 42, the Video Memory Interface 44 (VMI), the VGA Controller 232 (VGA) and the Video Processor 234 (VP). The PCI Interface 42 is the main interface between the PC host computer 22 and the image generation system 20. It supports both non-DMA and DMA read/write transfers. The PCI is responsible for the arbitration of the Host Bus 230 and the generation of address and data for interfacing with the external memory and the Basic Input Output System (BIOS) of the host processor. The PCI 42 receives Address/Control information from the MRC 212 and uses the Host Bus 230 to transfer data. The Video Memory Interface 44 provides an interface to external video memory and, like the PCI 42, the VMI 44 receives Address/Control information from the MRC 212 but data is transferred using the Video Bus 210. The VGA Controller 232 module provides VGA compatibility and interfaces with the VMI 44 and the VP 234 to provide control information. The Video Processor 234 is controlled by the VGA Controller 232 and is responsible for generating the video output. The VP 234 receives data from the frame buffer 24 through the Video Bus 210 controlled by the VMI 44.

Various aspects of the image generation system described above will now be described with more detail.

Conversion from Model to Screen Coordinates

The conversion from model to screen coordinates reflected in block 52 of FIG. 3 may be carried out by creating and applying transformation matrices and performing gradient calculations whereby the geometrical nature of transformations of digitally stored geometrically defined object descriptions are efficiently transformed into two dimensional images properly defined in screen coordinates. The scaling, rotation and translation of objects from modeling coordinates to world coordinates can be accomplished by matrix algebra multiplications. World coordinates can likewise be translated into eye coordinates, then into normalized device coordinates and finally screen coordinates, all by means of matrix algebraic multiplication.

The associative nature of matrix multiplication is defined by the fact that when a given series of specific matrices are sequentially multiplied (or concatenated), the order in which the matrices are concatenated has no effect on the final concatenated resultant matrix. The validity of the associative principle in matrix algebra concatenation presents a potential for improved efficiencies in image processing due in part to the degree that most objects selected for display in a screen image are translated, scaled and rotated in direct relationship to the presentation of another object or objects in screen coordinates. This hierarchy of objects, whereby the full set of matrices required to transform an object from its three dimensional applications model description defined in model coordinates into a two dimensional representation defined in screen coordinates is most likely a superset of another object's transformation matrix set, is of special utility in one novel approach of the present image generation system.

In view of the above, it is possible to transform model space geometric primitives into screen coordinates utilizing the plurality of parallel processing elements 32 of the processing element array 30. To transform primitives, specified subsets of the plurality of parallel processing elements 32 are assigned respective model space geometric primitives. These subsets of processing elements are then provided a plurality of transformation matrices associated with the respective model space geometric primitives. From these plurality of transformation matrices for a respective one of the model space geometric primitives a respective unified transformation matrix is determined. Then the corresponding unified transformation matrix is applied to a respective one of the geometric primitives to translate the geometric primitive from model coordinates to screen coordinates.

These operations are carried out using the processing element array 30 by each subset of processing elements 32 associated with a respective geometric primitive receiving one of the plurality of transformation matrices and evaluating the received transformation matrix to determine if the received transformation matrix corresponds to the respective geometric primitive associated with the specified subset of the plurality of parallel processors. The received transformation matrix is concatenated with any previously received transformation matrices corresponding to the respective geometric primitive associated with the specified subset of the plurality of parallel processors if the received transformation matrix corresponds to the respective geometric primitive associated with the subset of the plurality of parallel processors. As will be appreciated by those of skill in the art, a subset of processing elements 32 of the processing element array 30 may include a plurality of processing elements 32 or it may include a single processing element 32.

Figure 7:
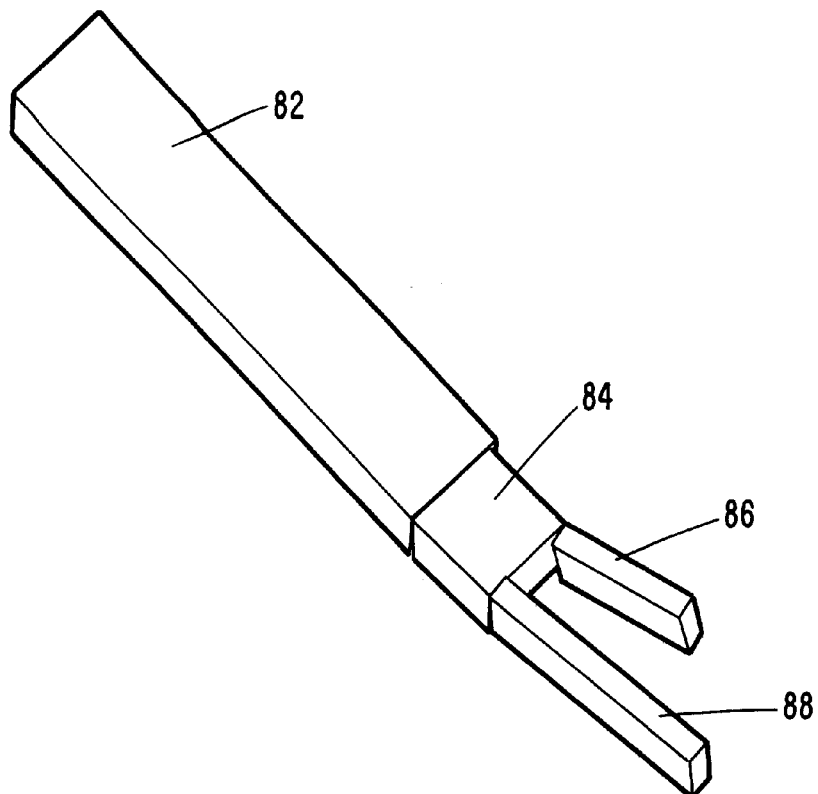
FIG. 7 is a three dimensional view of a robot arm.

Referring now to FIG. 7, a three dimensional view of a robot arm is presented. This image is defined by a set of objects to include forearm 82, hand 84, thumb 86, and finger 88. This three dimensional image of the robot arm in all of its particulars can be generated by concatenating a series of matrices that have a hierarchical organization. A determination of the placement of the hand 84 is dependent upon the placement of the forearm 82. A determination of the placement of the thumb 86 is dependent upon the position of both the forearm 82 and the hand 84, as is a determination of the placement of finger 88.

Figure 8:
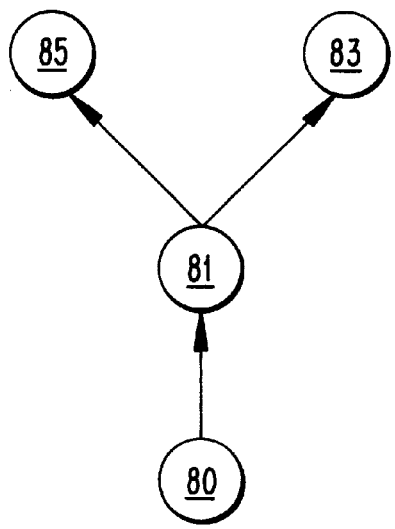
FIG. 8 is a tree diagram describing the relationship between the model objects of FIG. 7.

Referring now to FIG. 8, an assignment of node numbers 80, 81, 83 and 85 is illustrated. The position of forearm 82 is designated as node 80, the position of hand 84 is designated as node 81, the position of thumb 86 is designated as node 83, and the position of finger 88 is designated as node 85. The relationship between the positions of the various objects of FIG. 7 is illustrated in FIG. 8 by the tree wherein a span of the tree indicates the relationship between the objects represented by the nodes in that span.

The transformation of the robotic arm of FIG. 7 from model coordinates to screen coordinates may be carried out by successively applying transformation matrices corresponding to the nodes of the tree of FIG. 8. For each object of the model of FIG. 7 the nodes which lie along its path in the tree of FIG. 8 are applied to the object model. This successive application of transformation matrices is traditionally done through iteratively following the transformation tree of FIG. 8 to arrive at a unified transformation matrix for each node. However, in the present image generation system, the traversal of the transformation tree such as that shown in FIG. 8 may be done in parallel with only limited transmission of transformation matrices to the processing element array 30. The transformation from model to screen coordinates may be accomplished in the present image generation system by assigning specified subsets of the plurality of parallel processing elements 32 to respective model space geometric primitives such as the arm 82 or hand 84 of FIG. 7. A plurality of transformation matrices associated with the respective model space geometric primitives are then provided to the respective specified subsets of the plurality of parallel processing elements 32. The processing elements 32 then determine from the plurality of transformation matrices for a respective one of the model space geometric primitives a respective unified transformation matrix. The processing elements 32 then apply the respective unified transformation matrix to their respective one of the geometric primitives to translate the geometric primitive from model coordinates to screen coordinates.

The processing elements 32 may create the appropriate unified transformation matrix by receiving one of the plurality of transformation matrices and evaluating the received transformation matrix to determine if the received transformation matrix corresponds to the geometric primitive associated with the specified subset of the plurality of parallel processing elements 32. The processing elements 32 then concatenate the received transformation matrix with any previously received transformation matrices corresponding to the geometric primitive associated with the specified subset of the plurality of parallel processing elements 32 if the received transformation matrix corresponds to the respective geometric primitive associated with the subset of the plurality of parallel processing elements 32.

Figure 9:
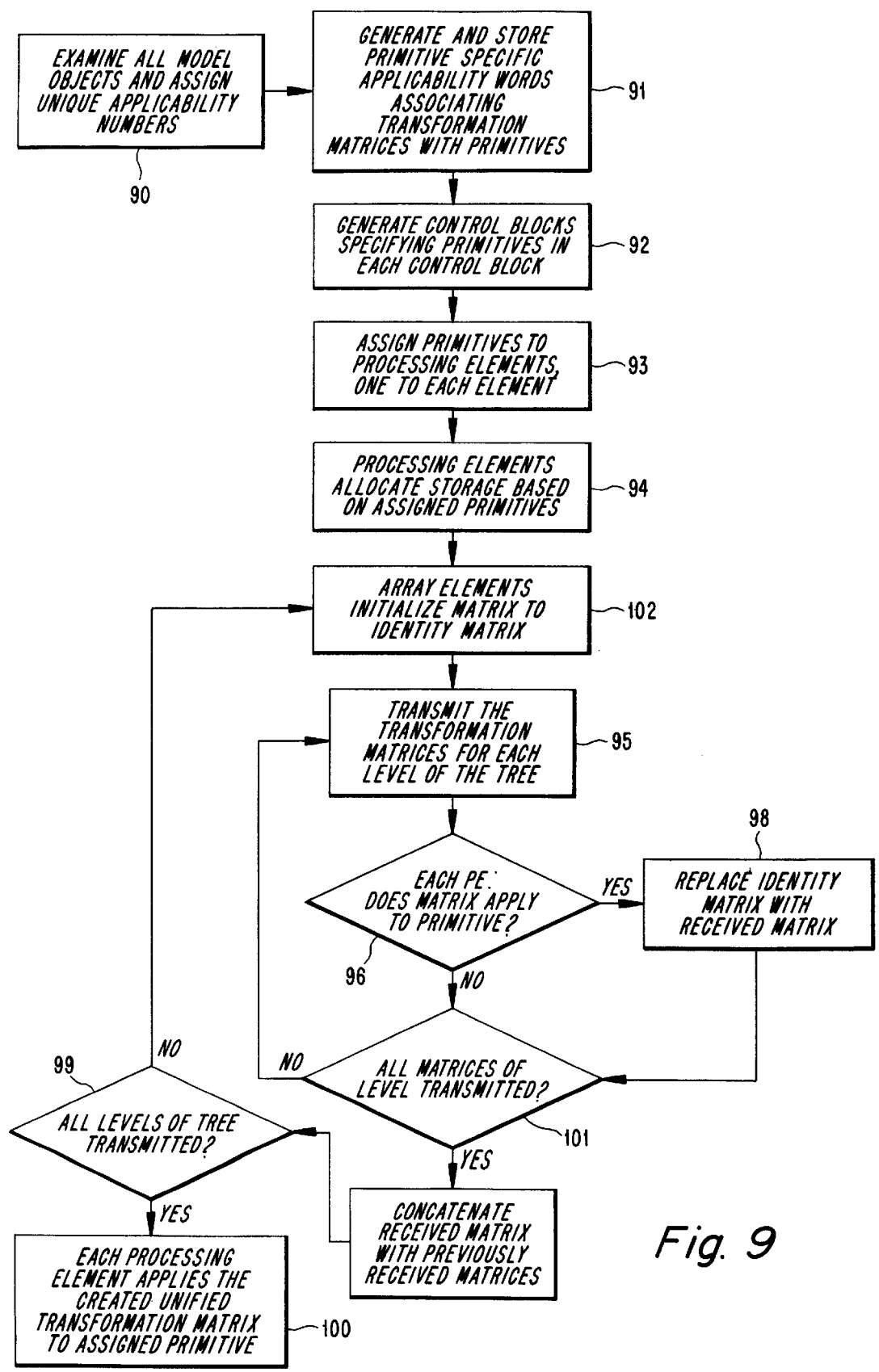
FIG. 9 is a flow chart describing aspects of the image generation system of FIG. 1 relating to conversion from model to screen coordinates.

This transformation from model to screen coordinates will be described with reference to FIG. 9 which is a flow diagram of the operations carried out by the resources of FIG. 2 to implement the above transformation process.

Objects which are made up of primitives are processed by transforming each primitive separately. One way of distinguishing the transformation of any two primitives are the original model space vertex values of each primitive, and the full set of matrices used to transform a given primitive into screen coordinates. To these ends, the complete set of all objects in a frame are examined, and each object is assigned a unique applicability number as seen in block 90. The applicability numbers may be assigned by the host processor 22 or may be assigned by the processing components of the central control unit 38 and the processing element array control unit 40. However the applicability numbers are assigned, the applicability numbers allow for the control of the selection of each object transformation matrix for concatenation in the preparation of the unified transformation matrix of a specific primitive. (A unified primitive specific transformation matrix is created by concatenating all relevant transformation matrices to fully and properly translate a primitive from model coordinates to screen coordinates.)

Each primitive is then examined to determine which matrices found on the screen are applicable in the generation of its own unified transformation matrix. A primitive specific applicability word is then created, whereby the results of this examination are stored in associated records for each primitive. These operations are illustrated in block 91 of FIG. 9 and, like the functions of block 90, may be carried out by the host processor 22 or the image generation system 20.

Each primitive is then examined to determine the regions of the screen where the primitive may reside. Control blocks are created, wherein a list of pointers which indicate the starting addresses of all primitives for each control block are stored. These operations are illustrated in block 92 of FIG. 9 and, like the functions of block 90 and 91, may be carried out by the host processor 22 or the image generation system 20.

As seen in block 93 a set of primitives are then assigned to a bank of processing elements 32. Each processing element is assigned to one specific primitive which has associated with it a primitive specific applicability word.

All of the processing elements 32 are electrically connected to a common communications bus and to a relatively large memory storage circuit. This connection may be established through the central control unit 38 and the video memory interface 44 or PCI Interface 42. The use of the external memory circuit may be necessitated by the fact that the processing elements 32 have only a small amount of memory 34 in their own dedicated circuitry. As seen in block 94, the processing elements 32 compare the memory space required for storage of primitives during and at the conclusion of their processing activities. The processing elements 32 assign starting memory locations for their working space within the external memory in accordance with the precise requirements of processing their assigned primitives. Maximal utilization of the additional memory storage space is thus effected by the bank of processing elements determining the assignment of memory space in accordance with specific memory requirements of each primitive.

The processing elements 32 then initialize a receive matrix to the identity matrix as seen in block 102. As is illustrated in block 95, the matrices for each level of the transformation tree is then placed on the common communications bus by the central control unit 38. Each processing element 32 examines its primitive specific applicability word to determine if the current matrix is to be applied to its assigned primitive. This decision is reflected in block 96. If so, the processing element 32 accepts the matrix data and replaces the identity matrix with the received matrix as seen in block 98. If the processing element 32 does not require the matrix, the identity matrix remains as the received matrix for the processing element 32. After all matrices for a level of the transformation tree have been transmitted, the processing elements concatenate their received matrix with any previously received matrices as shown in blocks 101 and 97. Optionally, the transformation matrices could simply be applied to the primitive. Thus, for the processing elements 32 not directed by their applicability word to accept any offered transformation matrix data for the level of the tree the concatenation operation of block 97 is between the previous matrices received by the processing element 32 and the identity matrix. Alternatively, a "no op" or no operations command could be executed if no transformation matrix transmitted is required by the processing element 32. The transformation matrices are provided to the processing element array 30 until, as seen in block 99, all matrices for all levels of the transformation tree have been processed by the array 30 have been provided.

By carrying out the above functions the data required for unified transformation matrix generation is rapidly and simultaneously communicated to a plurality of processing elements 32. At the conclusion of the production of the unified transformation matrices, each processing element 32 then performs identical steps. Each processing element 32 multiplies the vertices of its assigned primitive with a unified transformation matrix that it has created in the previous step of the process of the present invention. This operation is reflected in block 100. As primitives might consist of structures with varying number of vertices (e.g. points, lines, triangles and quadrilaterals) identity matrices and/or "no op" commands are used in various preferred embodiments of the present invention to allow simultaneous execution in a plurality of processing elements.

In the context of the image generation system of FIG. 2 and the image of FIG. 7, in the operation of one embodiment, the central control unit 38 selects a region of a screen to be generated by the plurality of processing elements 32. The central control unit 38 reads the corresponding control block for a specific region, and assigns the addresses of primitives' applicability words indicated by the appropriate control block sequentially to each of the plurality of processing elements 32. Thus, the applicability words for the primitives which make up the model objects 82, 84, 86, and 88 are assigned to processing elements 32.

Each processing element 32 then accesses the corresponding applicability word specified by the address corresponding to its assigned primitive. The plurality of processing elements 32 examine the nature of the specific primitive to which they have been assigned, and determine the amount of memory required for use in external memory in the process of calculating and storing the transformed primitive. The plurality of processing elements 32 then assign memory addresses of areas of external memory dedicated for exclusive use by each processing element 32 during the calculation of the assigned region's pixel values.

Central control unit 38 then places the data for each transformation matrix on the system communications bus to the processing element array 30, to include the corresponding matrices for nodes 80, 81, 83 and 85. All processing elements 32 read the data placed on the system communications bus simultaneously in accordance with directions found within the applicability word corresponding to each assigned primitive. This technique allows a plurality of primitives to be transformed simultaneously and thereby reduces the repetitiveness of transmitting the matrix data to the plurality of processing elements 32 that is required for transformation calculations.

This technique further allows the full plurality of processing elements 32 to be executing the same instruction simultaneously. As the full set of transformation matrix data is processed, each processing element 32 concatenates the newest and most recently transmitted matrix with the existing transformation matrix of the uniquely assigned primitive, or concatenates with an identity matrix, in accordance with the directions found in the corresponding applicability word of the assigned primitive.

After the full set of matrix data has been made available to the processing element array 30, and the final transformation matrices for each primitive have been created, each processing element 32 processes the vertices of the uniquely assigned primitives and transforms the model coordinates into screen coordinates. This operation is accomplished by the processing element array control unit 44 stepping each processing element 32 simultaneously through an identical series of logical instructions.

Texturing

The texturing aspects of the present image generation system will now be described in more detail. These texturing aspects are reflected in blocks 71 and 72 of FIG. 5.

The addition of texture to each polygon is made possible by using perspective transformation information together with the texture mapping information to provide for the pixels of each polygon in screen coordinates with coordinate values within the texture space (u,v) and with an additional level of detail ("LOD") value. The LOD represents the area of a pixel in the texture space and will ultimately be reflected in the selection of MIP MAPS for texturing. The resultant set of (u,v and LOD) points correspond to redefined color and intensity values or "texels" defined within a texture space.

The term perspective transformation is used to denote the process of computing an object's instantaneous orientation in relationship to a viewer of a graphical image. The perspective transformation of the objects of a scene defines an image composed of polygons which are defined in x, y space.

A perspective projection, with an array of x, y vertices that define a group of component polygons, is calculated using the calculated distance from a viewer's position to the surface of each object. Perspective transformation produces a matrix of polygon vertices specified with u, v and LOD values. Perspective transformation of an object model of a two or three dimensional object can include a plurality of two dimensional polygons each defined in the rectangular coordinates of the display screen, x-y space. Each of such polygons is defined by a set of vertices, each vertex being located at a specific (x,y) coordinate as defined in the x-y space. The polygons may be described by a set of linear arithmetic expressions of the form Ax+By+C which defines a line in x-y space which intersects with other lines which define the boundary of the polygon at the vertices of the polygon.

The result of perspective projection is to convert from three dimensional space to x-y two dimensional space with certain information also being determined which is dependent on the third dimension such as u, v and LOD. The LOD of a given texel, pixel or polygon is determined in the rendering steps of an application or system program module taking into account the distance and angle of view of the textured surface. The levels of detail of a texture map are conventionally precomputed for later access during rendering.

Displaying a texel requires that the different intensity values and other contributory qualities, such as illumination and shading, be calculated on the basis of a pre-defined texture map. The (u,v) and LOD values that define the position in texture space can be in fractional form, where none of the three values correspond to an exact pre-defined texel coordinate map value.

If the fractional part of the texel address is simply truncated for the look-up of the texel value, then certain anomalies will occur in the computed image. The anomalies include unnatural variations in the appearance of the texture pattern in successive frames of an animated sequence.

To avoid these anomalies, conventional methods direct that the exact RGB or YIQ intensity values for each pixel on the display screen is to be calculated by accessing a set of individual, predefined texel intensity values that are stored in dedicated texture map memory.

Typically, the four most proximal points are selected from each of the two proximal level of detail planes of each of three contributory texture maps (e.g. a red contribution map, a green contribution map, and a blue contribution map). Thus, a total of eight R,G,B values are accessed for each computer pixel.

The polygon pixel contribution values are interpolated from the eight sampled texture map points. In the case of a system using RGB components, the interpolation is carried out in each of the three component color maps, and the results are used together as the resultant color intensities for display by an individual pixel on a graphics screen.

The texturing aspects of the present invention are used after dispersal of the contributions to the processing elements 32 and the processing elements 32 are provided u, v, and LOD values. These values, almost invariably, are fractional, and, therefore, they are assumed to be fractional for the purpose of calculations.

The u, v, and LOD value as generated by the rendering process define a texel contained within a texture map. The exact value of this texel can be interpolated on the basis of the stored texel values found in each of a set of texture maps (i.e. an RGB set, or a YIQ set).

In conventional art the stored map values of the most proximal texels of the LOD level above the home pixel value u, v, and LOD coordinates, and of the LOD level below the home pixel u, v, LOD coordinates are fetched from each texture map one by one.

Typically, four (4) values from each stored LOD value are fetched, which requires eight (8) separate fetches from an off-chip memory. If the maps have an RGB set, eight fetches must be made from each of three associated texture maps. The data then is discarded after each intensity value of each home pixel value is calculated, and map data is fetched entirely via off-chip data transfers for the computations for the next home pixel.

However, in accordance with the texturing aspects of the present image generation system, texture map data is brought from an off-chip storage device in data blocks. The accessed data blocks then are shared among the processing elements for use in calculating individual color intensity values of the home pixels. This technique reduces, if not eliminates, redundant data requests, reduces the amount of processing time required to access off-chip data by fetching large blocks of data, and permits the use of compressed texture data memory in high speed video and graphics systems.

Compressed texture map data is manageable in the method of the present invention due to the significant reduction in processing time required to read data from the texture map storage circuit. Therefore, there is processing time available to perform decompression algorithms. Because multiple PEs are used to process the texture information the processing elements share texture blocks across primitives, which thereby further reduces the processing required to texture the primitives.

Figure 10:
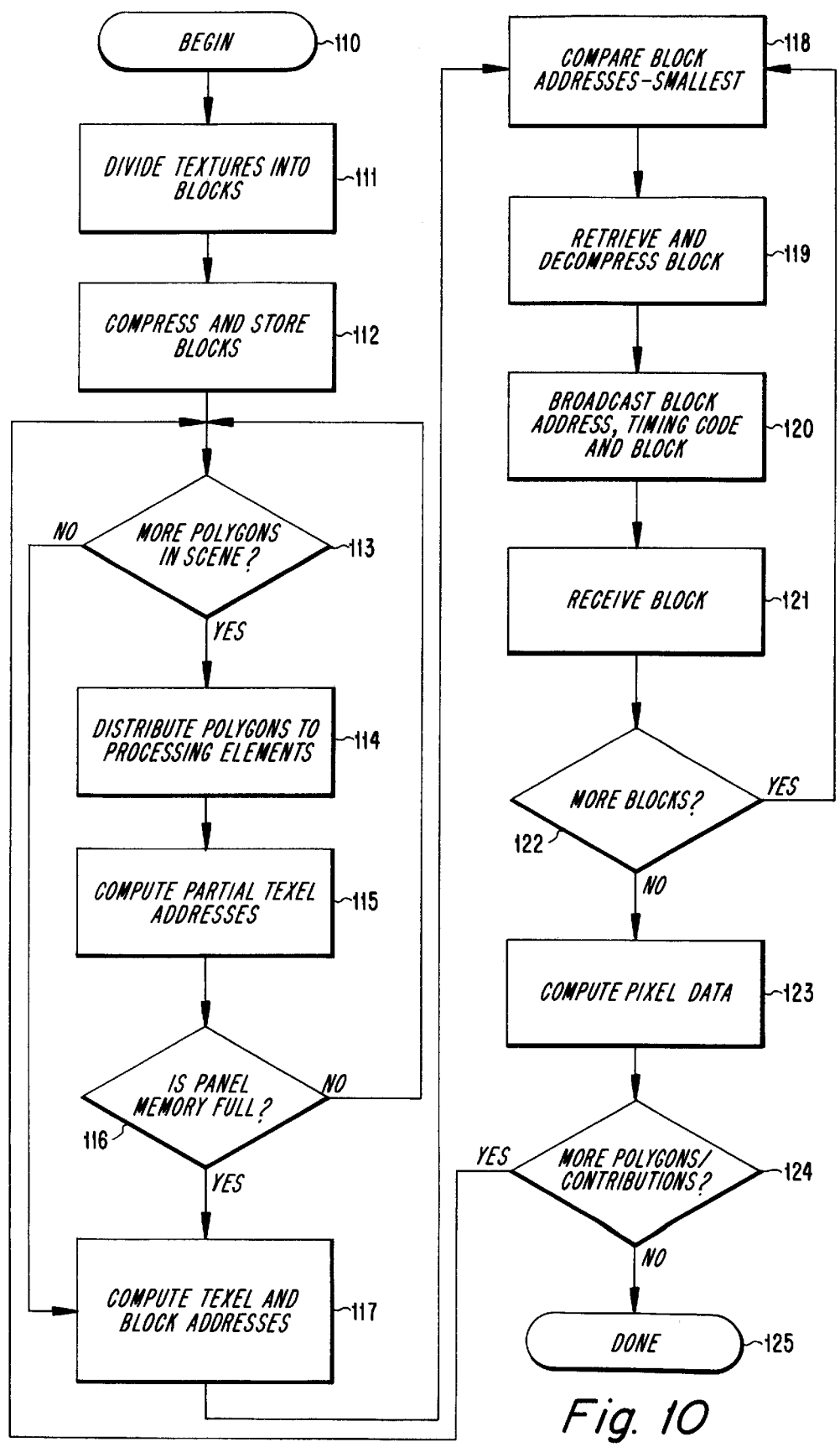
FIG. 10 is a flow chart showing texturing aspects of the present invention.

The texturing aspects of the invention are described first with reference to the flow chart of FIG. 10. Subsequently, an apparatus of one embodiment will be described in detail, as well as the implementation of a method with the apparatus.

With reference to FIG. 10, before polygon processing begins, in block 110, texture pattern maps are divided, 111, into equal size blocks of texels. Typically, there are 8×8 texels in each block. In general, the block size is selected to minimize bandwidth. If the block size is too small, fewer duplicate addresses will be found, and there will be little sharing of block data. If the block size is too large, too much unused data will be retrieved.

In block 112, the blocks are compressed and stored. Compression is done in two steps. First, a block-oriented compression scheme is applied, preferably wavelet compression. Block-oriented compression is any means of compressing data suited to two-dimensional images, especially images organized into two-dimensional blocks. Forms of block-oriented compression include JPEG compression and wavelet compression such as described below. Then, an entropy encoding method of compression is applied to reduce the storage requirement further. Entropy encoding may be carried out by an entropy encoder or any means of compressing data suited to serial data streams. Forms of entropy compression include Huffman encoding, run-length encoding, and arithmetic encoding. An addressing scheme is used whereby the address of a stored block can be computed from a texel address; an index computation followed by a table look-up is one suitable scheme that has been entirely effective.

Scene processing then begins, in block 113, with a test to determine whether there are polygons remaining to be processed. Initially, there are many polygons to be processed, although it is logically possible that there will be none. If polygons remain, control passes to block 114.

In block 114 the polygon is broadcast to the processing elements in the system. The method seems to perform smoother with 256 or more processing elements in parallel. However, the method will function effectively with fewer processors, including the single processing element of a conventional computer. With fewer processing elements, each processor computes a larger set of pixels.

Then, in block 115, each processing element begins computation of the texel addresses corresponding to the texel data needed for the pixels assigned to that processor. The computations of the texel addresses follow standard techniques, which usually involve perspective division. The status of local memory is checked in the middle of the texel address calculations, and this is performed in block 116. The texel addresses associated with a surface of a polygon being processed may be referred to as surface texel addresses.

For efficiency, it is best to accumulate as many texel block addresses as possible before proceeding further. If, in block 116, panel memory is found to be not full, then control is passed back to block 113 for further polygon distribution. When panel memory is found by block 116 to be full, processing advances to block 117.

In block 117, all of the processing elements finish computation of the texel addresses, and then, they compute the block addresses according to the scheme established in block 112. Separate hardware can be used to compute the block addresses from texel addresses. The block addresses associated with the texels of a surface of the polygon may be referred to as surface block addresses.

The list of block addresses computed in block 117 is given next to a minimum detector in block 118. A minimum detector is an electronic circuit or a process that receives two or more values, orders (sorts) the values numerically, and deletes redundant values. A minimum detector may include the sorter 204 of FIG. 6. Preferably, the minimum detector 118 is implemented in special hardware having 64 or more concurrent inputs. The block addresses are sorted and compared, and any redundant block addresses are removed from the list. The operation of the minimum detector could be programmed alternatively in a processor rather than implemented in special hardware. The minimized list or "sorted surface block addresses" is passed to block 119.

In block 119, texture pattern blocks are retrieved from memory one-by-one. A retrieved block is processed first through entropy decoding to undo the entropy encoding applied in block 112. Then, block-oriented decompression is performed to recover the texel data in the block. Depending upon the details of the particular implementation, the decoding or decompression, or both, could be performed in special hardware, by an array of processing elements, or by a single processor.

As an example of the benefit of minimization, when 256 PEs 32 are requesting texture map data and when the data of each LOD per texel is being examined in separate loops, up to 1024 texture map block requests might be generated. The present invention directs that all block fetches be sorted and that redundant requests be discarded. A typical result would be that all 256 PEs 32 could be satisfied by 10 different data block fetches.

Next, in block 120, the block of texel data is transmitted to each processing element. Preferably, this is done by broadcasting the block address, followed by a timing code, and then, the individual texel data elements in a predetermined order indicated by the timing code.

Each processing element can select, in block 121, the texel data it needs from the stream of broadcast data.

After each block is broadcast, a test is performed in block 122 to determine whether more blocks remain to be retrieved for the current list. If there are more blocks to be retrieved, control is returned to block 118. If there are no more blocks, computation of the pixel data proceeds in block 123.

Pixel colors and intensities are computed in block 123 using standard techniques. The color component for a pixel is found by tri-linear interpolation from the corresponding color components of the eight nearest texel values.

The calculation of a pixel value requires interpolation on the basis of the u, v and LOD values held by the processing elements, and 8 texel values from the appropriate texture map. These 8 texture map texels consist of the 4 nearest texels found in the LOD texture map level above the LOD value of the processing elements, and the 4 nearest texels of the LOD texture map level located below.

Most processing elements 32 will only require the use of two 8 by 8 blocks of texel data, namely from the most proximate block of the higher LOD plane and from the most proximate block of the lower LOD plane. It is possible, however, that data contained in 8 different blocks must be accessed. This would occur where each of the 8 closest points (i.e. 4 above and 4 below) in the texture map are in separate data blocks.

Next, a test is performed in block 124 to determine whether there are more polygons to be processed in the current scene. If there are more polygons, control is returned to block 113 and from there to block 114 to distribute more polygons to the processing elements 32. If there are no more polygons for the region, the texture process ends, block 125.

Wavelet Compression

As discussed above, wavelet compression may be utilized in compressing texture maps for use in the present image generation system. As described above, in the present image generation architecture, texels can be broadcast to the processing element array 30, with each processing element 32 saving the eight texels closest to the sample point. To avoid sending unneeded texels, texture maps are broken into small blocks (preferably 8×8) and only those blocks which contain needed texels are broadcast.

To reduce the bandwidth needed during the texture broadcast, textures can be compressed using any of the compression schemes normally used for image compression (JPEG for example). Many compression schemes are based on transform methods in which an image is represented by a sum of basis functions. In FFT methods, the basis functions are sine waves of various frequencies. By specifying the amplitudes of each basis function, the image can be fully described. The frequencies are usually implied, while the amplitudes are specified. Compression is achieved by scaling and quantizing the amplitudes.

In addition to traditional compression techniques, wavelet compression utilizing wavelet basis functions may also be utilized in the present image generation system and, in fact, is preferred over other techniques. Wavelets, unlike the sine wave basis functions, are compact in space. That is, they contain a single period of the wave, not an infinitely repeating sequence of waves. The basis functions are a set of these waves at different scales.

The use of wavelet based compression schemes for texture compression provides at least two significant benefits. The first benefit is that unlike wave based approaches, the complete set of amplitudes is not required to decompress a texel. For 2D images, approximately ¼ of the amplitudes are required at any one texel. The non-standard decomposition of the Haar basis requires only 10 of the 64 amplitudes to decompress any texel in the 8×8 image. By broadcasting basis functions which do not overlap in parallel across multiple buses, each processing element can select the one bus containing the amplitude of the basis function for which it has non-zero support.

A second benefit of wavelet based compression is that the basis functions are scaled by a factor of two between frequencies. This matches the scaling of LODs of MIP MAPS and can be used to synthesize the coarser LOD image during the decompression of the finer LOD image. For example, one method of computing the MIP MAP hierarchy is to box filter the image using a filter of width 2. In the 1 dimensional 8 texel image, the 4 texel image at the next coarser LOD is computed by averaging the first and second texels, the third and fourth, the fifth and sixth, and the seventh and eighth. By decompressing the 8 texel image using only the first four basis functions of a wavelet basis function results in the same 4 texel result as box filtering the 8 texel image.

Thus, one method of utilizing texture maps in the present invention includes encoding a level of detail of the texture map as a sum of a plurality of scaled wavelet basis functions. A texture map corresponding to a more coarse level of detail of the texture map which is encoded may then be generated from the wavelets comprising the lower frequency wavelets of the wavelet basis functions of the texture map corresponding to a finer level of detail. The coarser level of detail may be generated from the lower half of the frequencies of the wavelet basis functions of the texture map corresponding to the immediately finer level of detail. This generation may take the form of truncating from the set of wavelet basis functions the higher frequency basis functions of a finer level of detail. Optionally, the generation of coarser levels of detail may be successively carried out to generate texture maps for coarser levels of detail from the texture map for a finer level of detail. One suitable set of basis functions are Haar wavelet basis functions.

In an off-line process, the texture maps (i.e. each block of texture data) for each level of detail may be compressed utilizing wavelet compression. This may be accomplished by determining an amplitude value for each of the plurality of wavelet basis functions such that the sum of the product of the plurality of wavelet basis functions and the corresponding plurality of amplitude values results in a predetermined level of detail of the texture map. Each of the plurality of amplitude values are then divided by a corresponding scaling coefficient and that coefficient is quantized to create a compressed wavelet amplitude value. In a preferred embodiment, the plurality of scaling coefficients comprise a plurality of odd integers. The next coarse level of detail may then be recreated by recreating the amplitude for the lowest frequency half of the plurality of wavelet basis functions by multiplying the compressed wavelet amplitude value by the corresponding scaling coefficient and dividing the result by a corresponding coarse scaling coefficient associated with the coarser level of detail.

Once the level of detail of a texture map required by a processing element is encoded as a sum of a plurality of scaled wavelet basis functions, then all that need be transmitted over the communications interface to the processing element are the non-zero scaling factors resulting from the encoding. The processing element may then receive the encoded texture map from the communications interface and generate a texture map corresponding to the original encoded texture map by summing the product of the amplitudes received and the corresponding basis functions. Furthermore, a more coarse level of detail of the texture map may be generated from the wavelet amplitudes by utilizing only the lower frequency wavelets of the wavelet basis functions of the texture map corresponding to the finer level of detail.

Figure 11A:
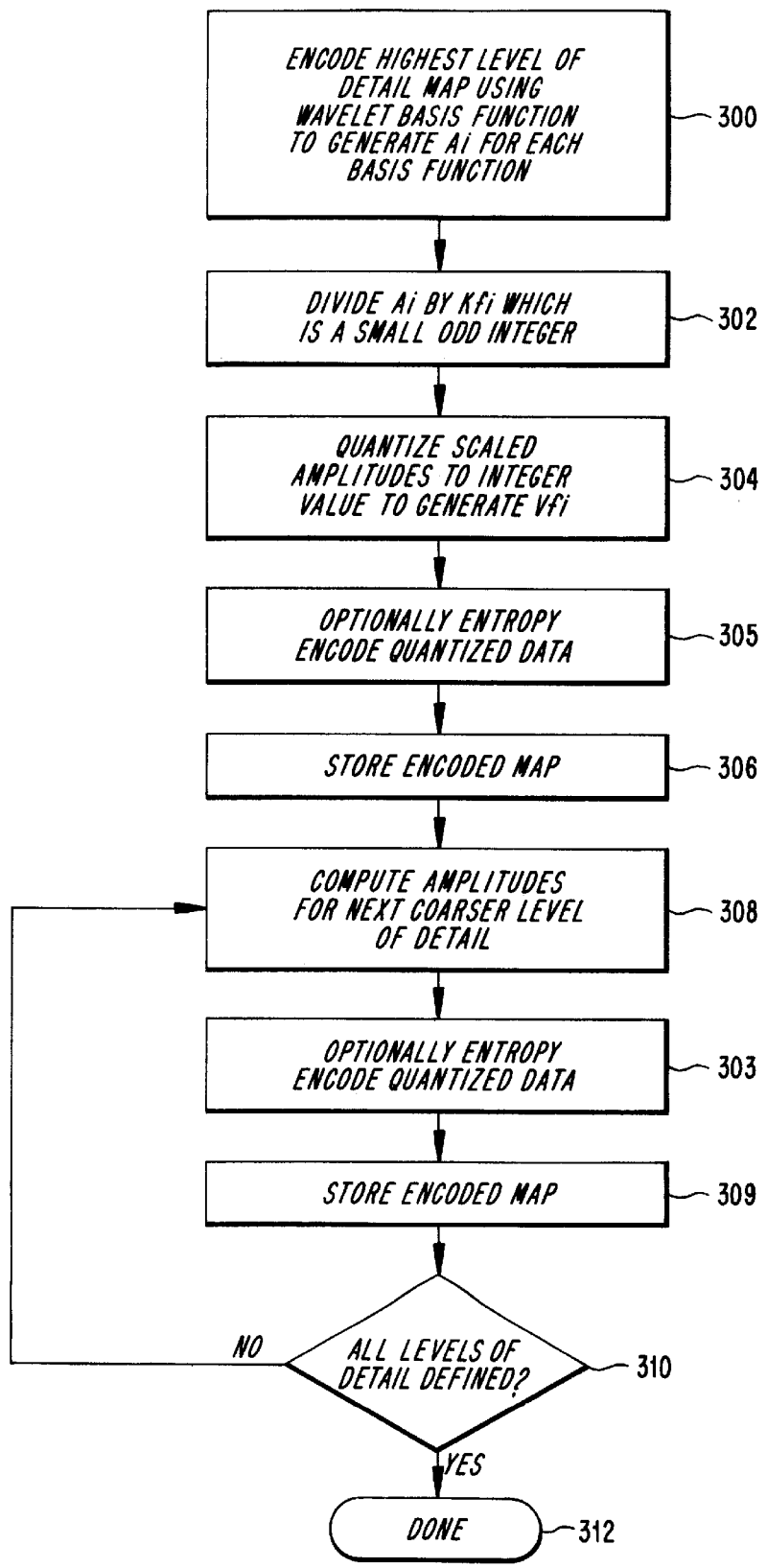
FIG. 11A is a flowchart of a wavelet encoding process.

One method of generating the compressed MIP MAP hierarchy for texturing reflected in block 112 of FIG. 10 is as described above and in FIG. 11A. This method first involves encoding the image using the wavelet basis function set as illustrated in block 300. The amplitudes (Ai) are then scaled by dividing by a small odd integer (Kfi) (the larger the integer, the better the compression ratio, but the more "lossy" the result) which is reflected in block 302. This integer (Kfi) is normally larger for basis functions with smaller support (i.e. higher frequencies). The resulting, scaled amplitudes (Ai/Kfi) are then quantized, for example by rounding, as reflected in block 304. In general, the scale value (Kfi) applied to a basis function in the fine LOD will not match the scale value (Kcj) of the corresponding basis function in the coarse LOD.

To compute the amplitude of the coarser image the fine image must be rescaled and quantized appropriately. The coarser amplitude is then computed by computing:

$$A'i = Vfi * Kfi; \text{ and}$$

$$Vci = round(A'i/Kci),$$

as reflected in block 308. This process continues until the entire MIP hierarchy is computed and stored as reflected in blocks 308, 309, 310 and 312. Optionally, as reflected in blocks 303 and 305, the encoded map may be entropy encoded prior to storage.

The reason for having only odd integers is to ensure that the point at which a scaled Ai/Kfi transitions from rounding up to rounding down aligns with a transition point for Aj/Kcj. If the transition points are not aligned, significant errors can be propagated during the MIP MAP generation process. Any image reconstruction errors caused by coefficient quantization in one LOD are passed on to all coarser LODs. The use of odd integers guarantees that the image reconstructed from the low frequency basis functions of an LOD matches the image reconstructed from the next coarse LOD.

Figure 11B:
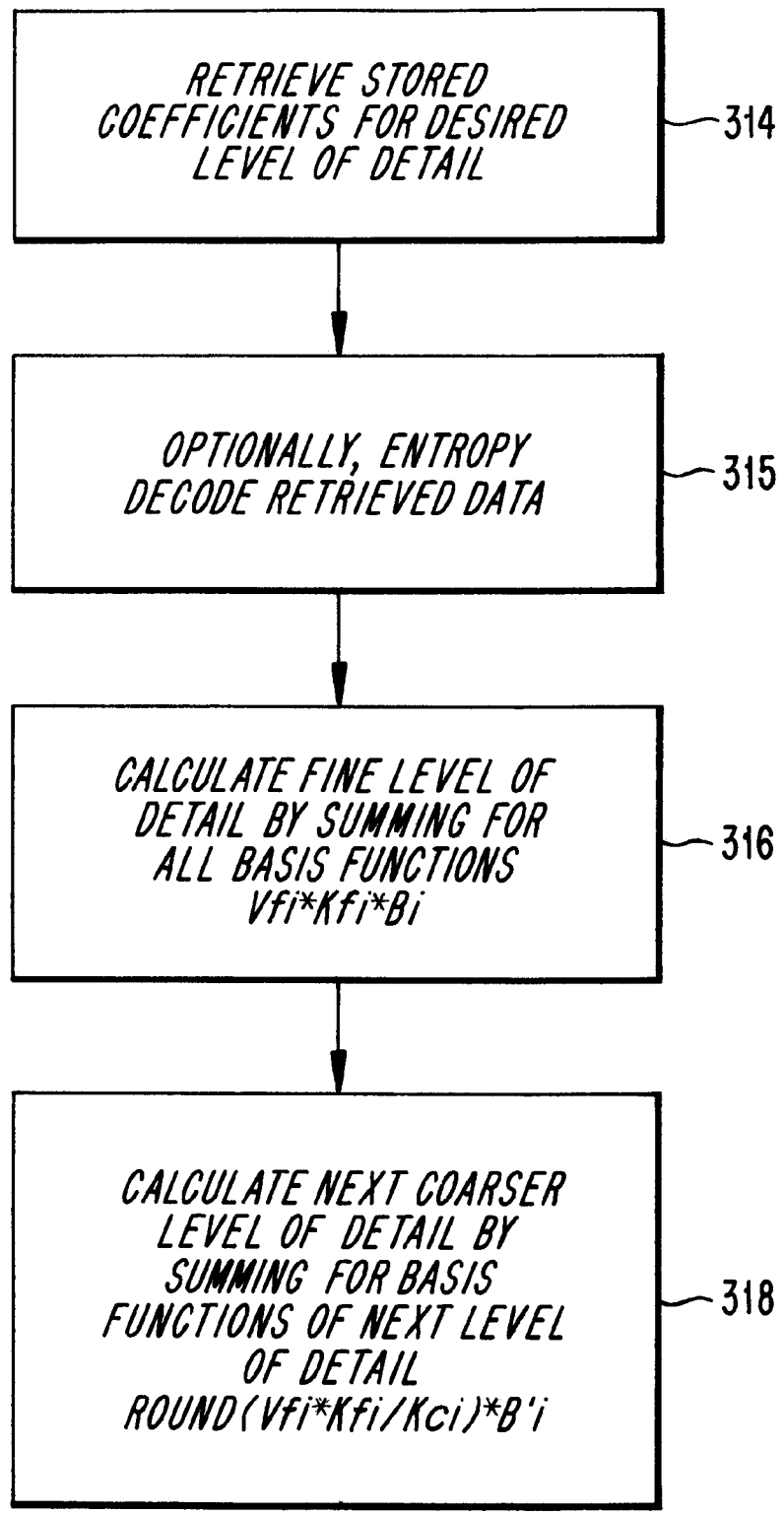
FIG. 11B is a flowchart of a wavelet decoding process.

One method to decompress both the fine LOD and the coarse LOD representation of a texel map as reflected in block 119 or, alternatively if compressed data is transmitted to the processing elements, block 120 of FIG. 10 is illustrated in FIG. 11B. First, the stored coefficients are retrieved as reflected in block 314. In the event that the stored coefficients are entropy encoded as reflected in blocks 303 and 305, these coefficients would need to be entropy decoded as reflected in block 315 before they are utilized. Then, as reflected in block 316, the fine level of detail texel is calculated by determining the following sum:

$$Tf = \text{sumi}(Vfi * Kfi * Bi);$$

where Vfi is the ith amplitude from the compressed image, Kfi is the scale factor associated with the ith basis and Bi is the ith basis function. As reflected in block 318, the coarse level of detail texel is calculated by determining the following sum:

$$Tc = \text{sumi}(\text{round}(Vfi * Kfi / Kci) * B'i);$$

where Vfi is the ith amplitude from the compressed image, Kfi is the scale factor associated with the ith basis, Kci is the scale factor associated with the ith basis in the coarse LOD and B'i is Bi if it is a low frequency function and 0 if it is high frequency.

In order to generate the eight texels required for interpolation, only the fine LOD texture is required. The coarse representation of the texture can be computed directly from the fine LOD texture. Thus, for determining the texture at a given pixel which typically requires interpolation between levels of detail, only a single fine level of detail need be fetched from memory and the coarser level of detail may be generated from that fine level of detail. LOD representations which are not needed as a fine LOD at a pixel never need to be fetched and decompressed.

Texturing Related Hardware and Operation

Figure 12:
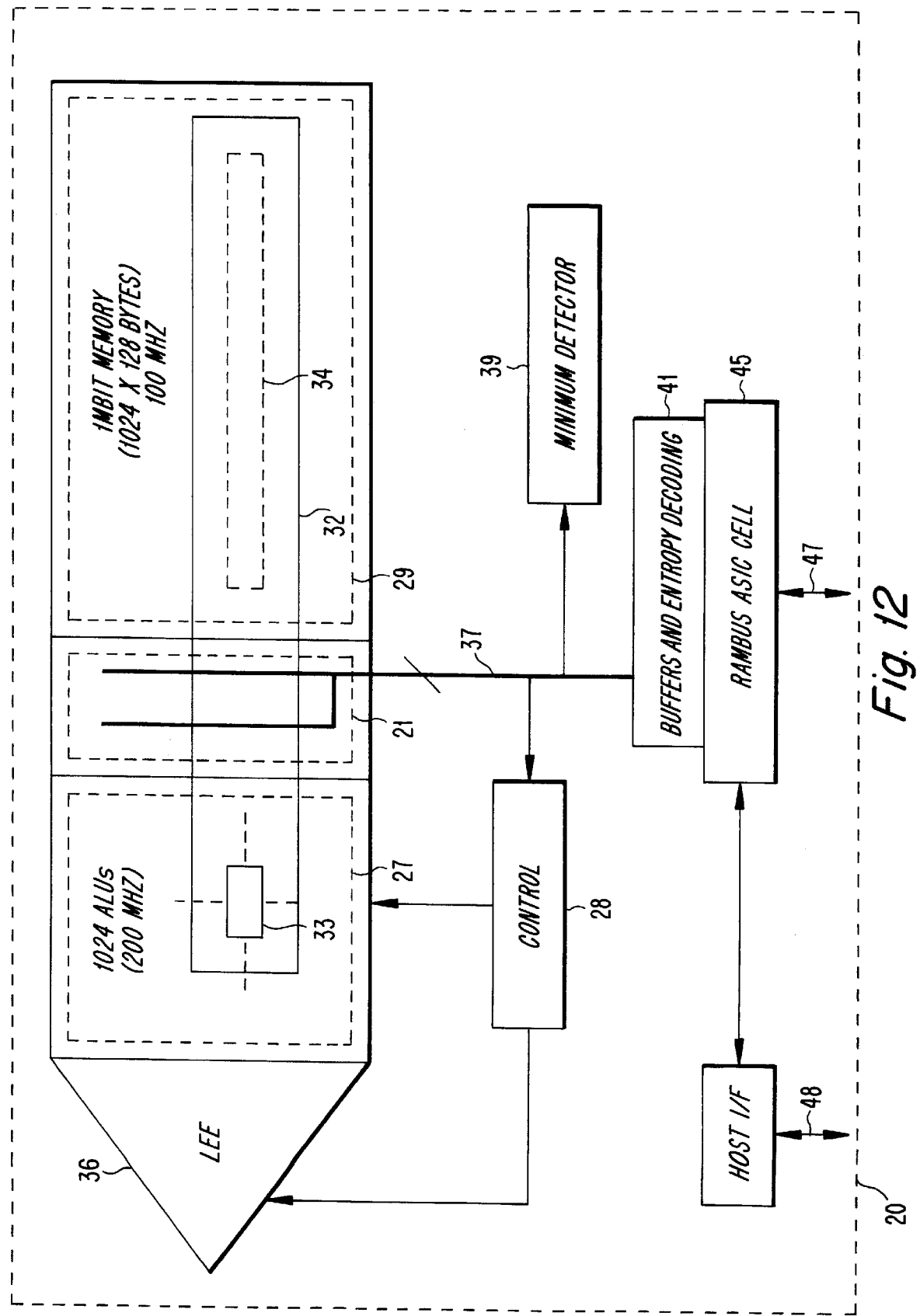
FIG. 12 is a block diagram of a circuit in accordance with the preferred embodiment of texturing aspects of the image generation system of FIG. 1.

Referring now to FIG. 12, a SIMD processing array image generation system 20, a "Single Instruction—Multiple Data" device defined hereinabove, is arranged according to the present invention and is illustrated in block diagram form. The numeral 27 identifies a bank of 1024 arithmetic logic units (ALUs) 33, and the numeral 29 identifies a memory section that is divided into 128-byte strips 34 memory and bus logic 31 (shown in FIG. 15) forms one processing element (PE) 32, FIG. 13.

All of the ALU's 33 within the ALU bank 27 are connected electrically to a single linear expression evaluator (LEE) 36, to a device control circuit 28, which may be part of the central control unit 38, and to each 8-bit simultaneous bus 37.

The LEE 36 evaluates expressions of the form Ax+By+C at each x and y point, where the x and y are specified partly by an ALU 33 and partly by the location of the ALU 33. The LEE 36, alternatively, provides immediate data for the instructions executed by each ALU 33. Immediate data is data transferred as part of an instruction.

A minimum detector 39, which may also be part of the central control unit 38 or processing element array control unit 40, sorts a number of the input values, nominally 64, and outputs the values that are unique in an ascending order.

A "Buffers and Entropy Decoding" circuit 41 is used to receive and decode data input from external memories, such as a high speed RAM. This circuit may include the Decoder 220 and the Data Bus Controller 222 described above.

Figure 13:
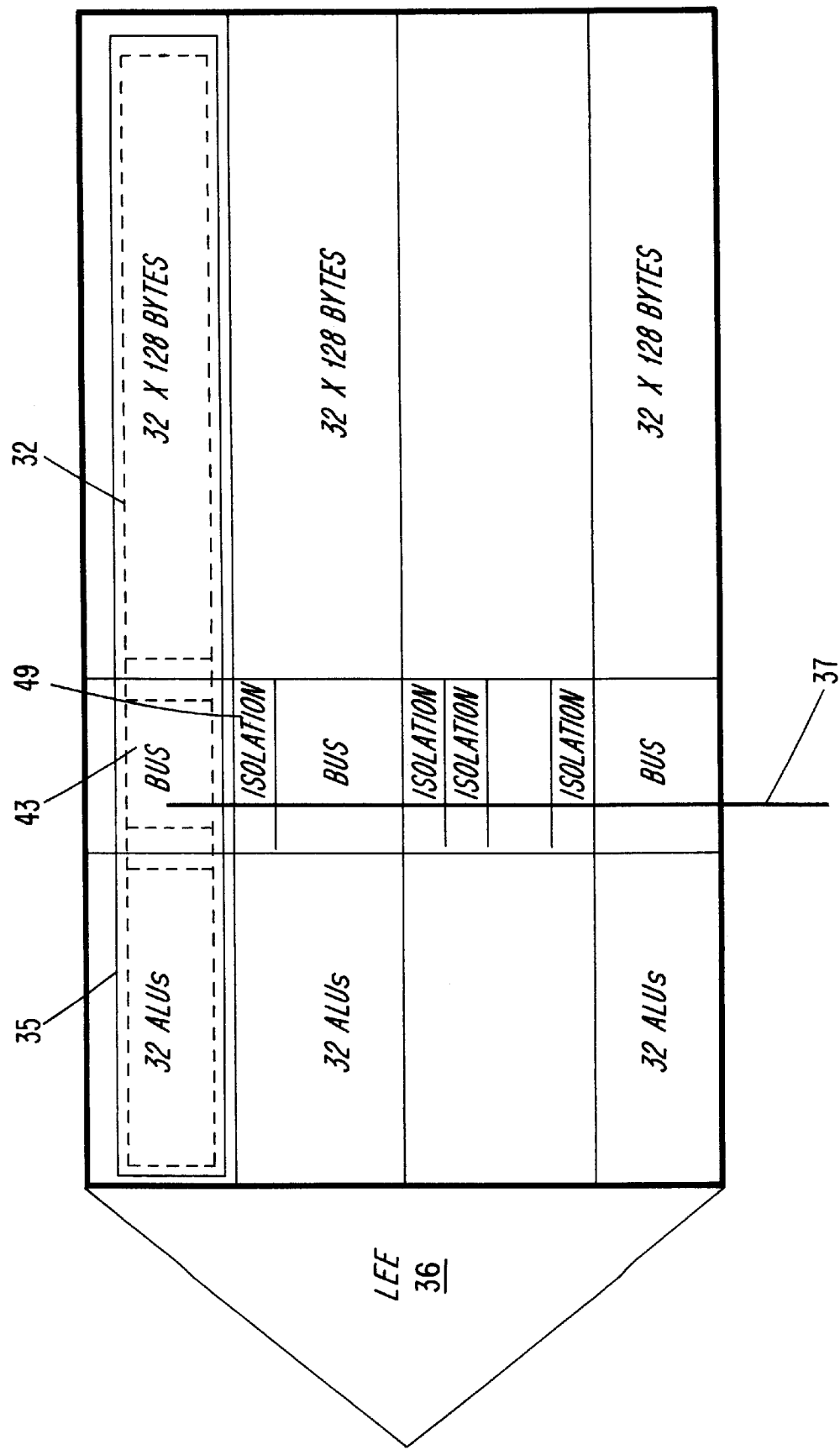
FIG. 13 is a block diagram illustrating panel organization and panel interconnections with respective circuit elements and components in accordance with the image generation system of FIG. 1.

Each panel bus 43, shown in FIG. 13, allows the processing elements (PEs) 32, to transmit and to communicate data from one processing element to another within a panel 35.

All of the elements in FIG. 12 and described above, as well as a host or PCI interface 42 and a RAMbus ASIC Cell 45, which may be part of the video memory interface 44, may be located within a single SIMD processing array image generation system 20. The SIMD processing array image generation system 20 communicates off-chip through the host or PCI interface 42 and the RAMbus ASIC Cell 45 by connections 47 and 48. In the alternative embodiment described above, the buffers and entropy decoding 41 and the RAMbus ASIC Cell 45 are replaced by the Central Control Unit 38 and the Video Memory Interface 44.

Referring next to FIG. 13, a panel organization diagram presenting three individual panels is disclosed. Each panel 35 includes 32 PEs 32, which generally do not communicate with one another except at specified times where they talk across a panel bus 43.

Most of the computational work of the present invention is done independently within each processing element (PE) 32. When there is communication, it can be either within a panel or between panels, in support of which an isolation element 49 is included in the panel 35 organization layout. Individual processing elements 32 within a panel 35 are able to communicate locally among other processing elements 32 within that panel 35, and to communicate via the isolation element 49 with PEs 32 outside of their home panel 35.

Communications within a panel can be done concurrently. Communications between panels are performed on each of up to eight 8-bit sections of the global bus 21. Data placed on a section by a PE 32 may be received concurrently by multiple PEs 32.

In other words, there are panel buses 43 that are isolated in each panel 35, or alternatively, they can be connected together, with a delay in the isolation element 49 to form one large global bus 21, FIG. 12.

Figure 14:
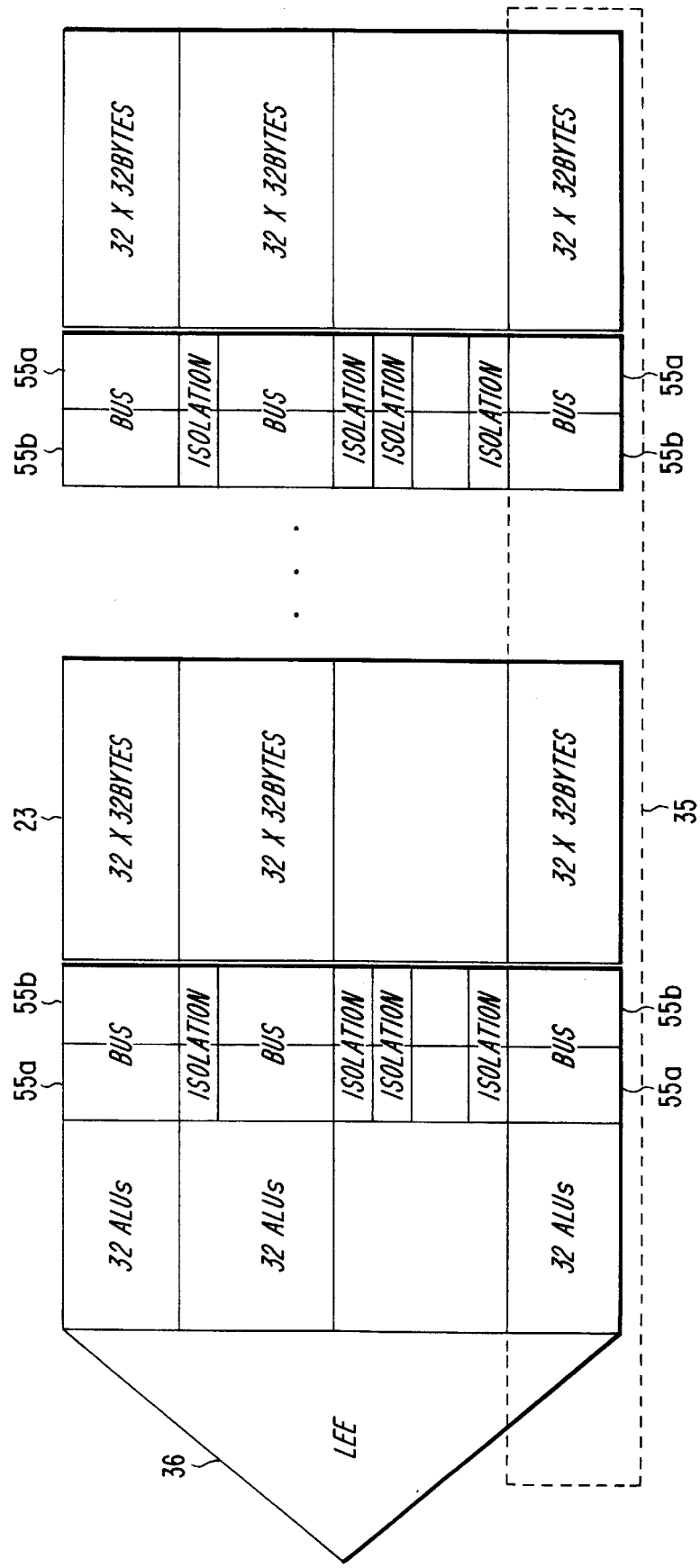
FIG. 14 is a block diagram illustrating panel and subpanel organization according to the image generation system of FIG. 1.

FIG. 14 illustrates a subpanel 23 organization, in which each panel 35 includes four of these subpanels 23. Each subpanel 23 has 32 bytes of memory and, as illustrated in FIG. 14, two 8-bit buses 55a and 55b. The memory and buses are organized into subpanels to allow an ALU 33 to select the subpanel 23 with which it will operate. In the alternative embodiment described elsewhere herein, each panel has a single 8 bit bus, however, the principles of operation remain substantially the same.

All of a panel's thirty-two ALUs 33 can operate on the same subpanel 23 for efficiency. Alternatively, it is sometimes beneficial for an ALU 33 to have the flexibility to select the subpanel 23 on which it will operate.

Figure 15:
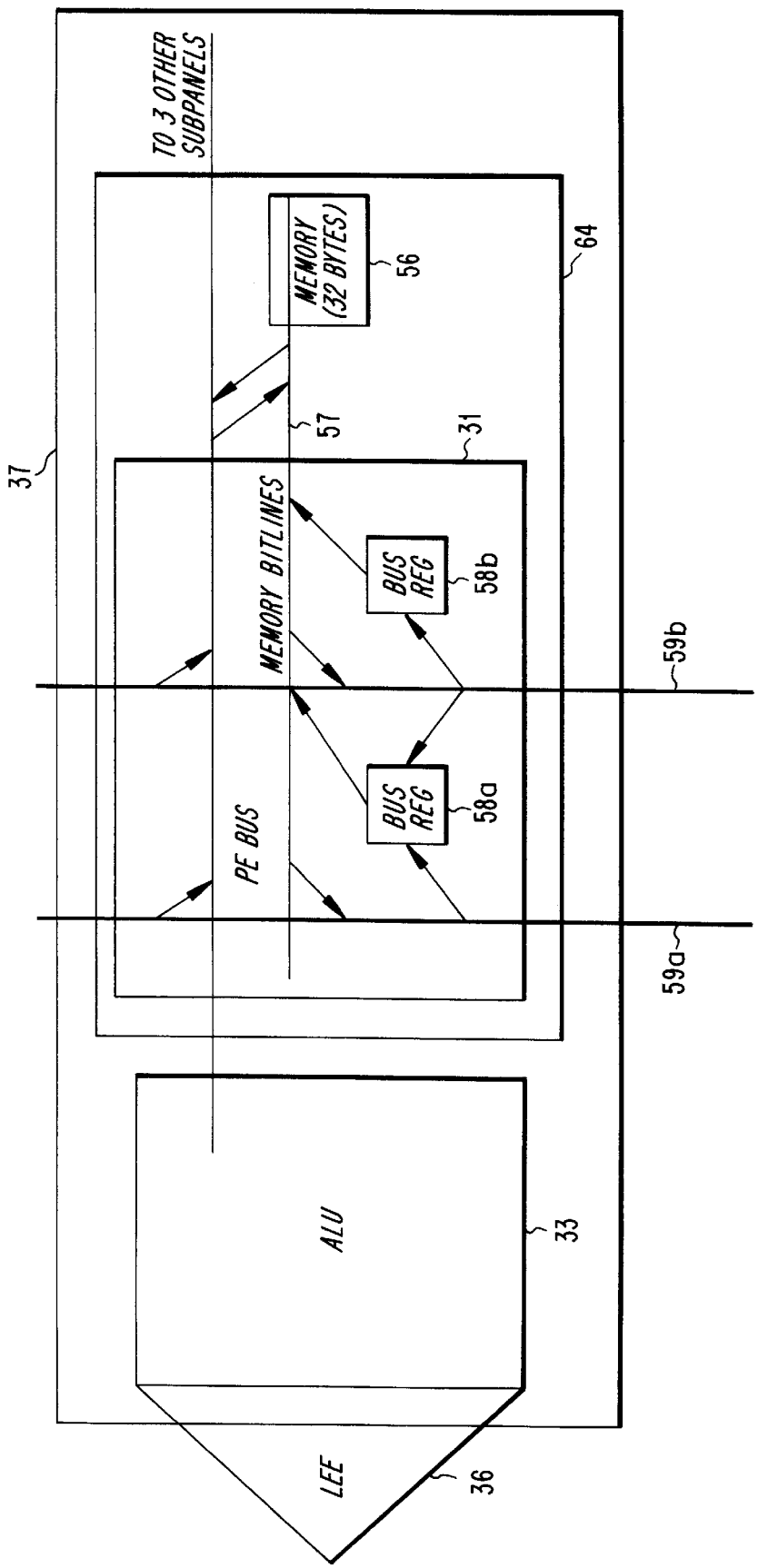
FIG. 15 is a block diagram illustrating details of a subpanel that is arranged in accordance with the image generation system of FIG. 1.

The internal structure of a subpanel may be examined by referring now to FIG. 15, which shows the LEE 36 and details of a PE 32, including the portion of a PE 32, called a sub-PE 64, having 32 bytes of memory and connected with the two 8-bit buses 55a and 55b.

During bus cycles, the PE bus contains control information for the cycle. This control information is calculated independently for each PE 32.

The subpanel memory 56 can either drive, or be driven by, a subpanel bus 57.

Each sub-PE bus interface 31 has a pair of bus registers 58a and 58b, each of which can be sourced from an 8-bit vertical bus 59a or 59b, and then, once data has been read into a bus register 58a and/or 58b, this data can be written onto the memory bit lines 57 and from the memory bit lines 57, directly into the sub-PE memory 56.

In one embodiment, each PE 32 calculates values in reference to the x and y position of a uniquely associated predetermined home pixel. In the preferred embodiment of the present invention, each PE 32 is associated with one particular pixel or set of pixels of an image.

Each of the sub-PEs 64 is connected closely to a pair of buses 59a and 59b that connects the sub-PEs to each other and to the sorter. The bus registers 58a and 58b expose data to the minimum detector 39 without requiring that the data be put on the back plane bus 37. All of these buses, therefore, enter the sorting network in parallel.

The minimum detector 39 finds the smallest requested element first, and then, it disables all redundant requests for that same block. The minimum detector 39, then, finds the next smallest requested element and repeats the preceding step.

The activity of finding the smallest address occurs in parallel and accesses all panels 35 simultaneously. One possible implementation is with only 64 texel addresses made available, including 8 from each of the 8 panels.

One form of a minimum detector 39 is a distributed device that communicates simultaneously with each panel 35.

Texturing Operation

The sorting operation is accomplished in stages. First, the thirty-two PEs 32 of a panel 35 are divided into 4 groups. The 8 PEs 32 in each group communicate their texture block data requests via internal buses 37 located within each panel 35.

The sorting process begins with a group of 8 PEs 32, each of which provides a texture block address to the minimum detector 39. These addresses nominally are 3-bytes long. A 3-byte value identifies the address of a block number of an external memory device. The detector 39, then, returns unique values of the first address bytes to all 32 of the PEs 32 in the order of the value of the elements of the block addresses that were provided.

The middle significant byte and the least significant byte are processed in this manner, whereby each PE's 32 requested block address is converted into a timing code sequence number. At the conclusion of this procedure, sequence numbers have been generated for the texels requested by each selected PE 32. As each unique value is determined, a texture fetch is initiated, and the PEs 32 are notified of the sequence numbers corresponding to the texture block which is available for reading off of the main bus. After the requests from the first eight selected PEs 32 have been broadcast, the remaining PEs are checked and processed in groups of 8.

Alternatively, rather than assigning sequence numbers, these operations could be carried out by presenting the address of the texel blocks to the processing element array along with the texel block data. The processing elements would then simply determine if they needed texture data corresponding to the address of the block which was broadcast to the array.

Elaboration of the above description will now be provided with respect to determining when panel memory is full, in block 116 of FIG. 10. It is possible that each panel 35 might not have the same number of contributions. A set of overflow locations is provided for each panel to manage this condition. Contribution calculation is halted when every PE 32 has a contribution or when any panel 35 has filled up its overflow locations.

With respect to the computation of pixel data in block 123 of FIG. 10, note that the full texel address stored in a PE 32 is a fractional address, which can be converted to a block address for a texel block, plus offset information. The block address designates an 8 by 8 block in texture space.

In one embodiment of the present invention, many calculations are done in loops. In certain cases the interpolation operations include substeps that minimize the amount of data that must be stored for pending calculations.

With respect to retrieval of texel blocks in block 119, note that certain forms of the invention fetch the required blocks from the upper and lower LODs in successive steps and perform partial interpolation operations. These forms of the invention reduce the maximum number of data blocks required to be simultaneously available for interpolation calculation from 8 blocks to 4 blocks.

The quantity of registers available also affect the methods by which texel addresses and data are managed. Typically 24 bytes containing 3 color components for each of 8 texels will be processed in order to determine one texel value. When only a few, such as 4 or 8, registers are provided, 3 or 6 loops of data reading will be required. An outer loop can be defined for both even and odd LOD texture map texel values.

The off-chip memory from which the blocks are retrieved may have a cache. If so, the sorting of block addresses in block 118 supports cache coherence. Sorting of the block requests can be advantageous also when blocks are fetched sequentially from external memories even if the memory is not cached. The significant result is improved efficiency in reading.

With reference to the decompression in block 119, inline decompression hardware may be used to convert the data stream to uncompressed form as it is received from memory. With respect to texture data broadcast in block 120, note that if the PEs 32 perform block decompression, then the decompressed data is broadcast with the PE array 30. Otherwise, the decompressed data is broadcast from the buffers 41.

Broadcast data is enabled onto the internal bus 37 in a predetermined order. Each PE 32 looks up the sequence number of each texel block it needs to access for interpolation, the u and v offset number for each texel it needs, and converts these data into a clock cycle number at which the desired data will be present on the bus 37. At the given clock cycle the data is captured in a bus register 58a and 58b.

Load Sharing and The Linear Expression Evaluator

An additional aspect of the present invention involves the linear expression evaluator. A Linear Expression Evaluator (LEE) is an electronic circuit that evaluates expressions in the form of Ax+By+C. The LEE 36 of the present invention is connected electrically to each processing element by means of a bus communications structure. The LEE accepts x and y inputs from each PE 32 separately and from predefined positions, and the LEE 36 indicates the placement of a given screen pixel or sub pixel as being inside or outside of a particular polygon. The A, B, and C values for specific calculations related to individual polygons also are provided to the LEE prior to each set of calculations by means of a data bus structure.

Referring now to FIG. 16A, a screen 130 is represented as comprising a two dimensional grid of 640 by 512 pixels in dimension. Screen 130 is further organized into a matrix of regions 132, each region comprising a two dimensional array of pixels. The regions 132 are described herein for illustrative purposes as 32 pixels wide and 32 pixels deep. A triangular polygon 134 is shown in FIG. 16A to extend over a multiplicity of regions 132.

Referring now to FIG. 16B, a region 132 is shown to be divided into four subregions 136. In the present example, each subregion 136 comprises a two dimensional array of 16 pixels wide and 16 pixels deep. The regional and subregional organization as shown in FIGS. 16A and 16B are based upon a processing element hardware allotment of 256 processing elements, however, other numbers of processing elements and region dimension may be utilized. This quantity of PE's and regional division permits each PE to be assigned four pixels as home pixels.

Referring now to FIG. 16C, a typical assignment pattern of processing elements 32 to a two dimensional block of physically adjacent pixels (i.e. a subregion) further illustrates the effectiveness and flexibility of the present invention in permitting computational load sharing within a panel 35 of the processing elements 32. The technique of intentionally dispersing the processing element 32 assignments to non-adjacent pixels increases the likelihood that any given panel 35 or any purposely segmented group of processing elements 32, will be evenly tasked with a similar amount of computing load as any other equally sized processing element panel 35 or segmented group while processing any particular frame.

This practice of effecting non-adjacent processing element 32 assignments, coupled with the load sharing made possible by the present invention within panels 35, significantly improves the efficiency of application of the raw computing power of the combined processing element array 30 of the present inventions.

Figure 17:
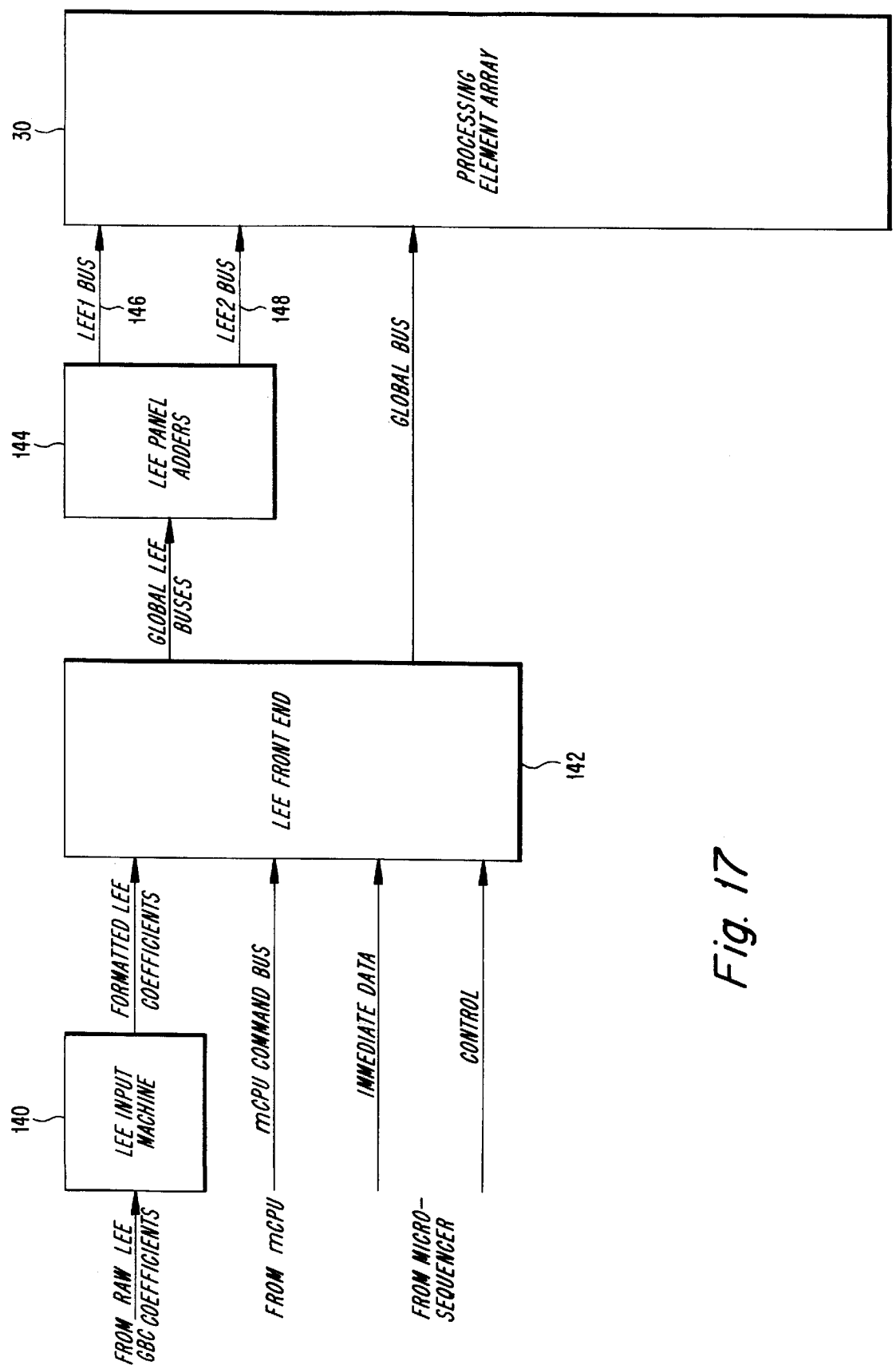
FIG. 17 is a block diagram of a linear expression evaluator of the image generation system of FIG. 1.

Referring now to FIG. 17, a linear expression evaluator 36 utilized in the present image generation system is illustrate in a block diagram. The linear expression evaluator 36 is disclosed as comprising a linear expression evaluator input machine 140, a linear expression evaluator front end 142 and a plurality of panel adders 144.

The linear expression evaluator 36 is responsible for evaluating the expression Ax+By+C where (x, y) is the address of a pixel. The processing element's 32 (x, y) address is programmable in the present image generation system. To facilitate this programmability of each processing element 32, the linear expression is expanded to:

$(Ax_r+By_r+C)+(Ax_p+By_p)+(Ax_o+By_o)$;

where $(x_r, y_r)$ is the region base address, $(x_p, y_p)$ is the panel address offset and $(x_o, y_o)$ is the processing element address offset.

The region component is common to all processing elements 32 and has a range of 0 to 4096 in increments of 16. Only polygons touching pixels in a region are processed for the region. If a polygon touches more than one region it is processed in each region it touches. The panel address offset and region base address are common to all processing elements 32 in a panel 35. The panel offset has a range of 0 or 1 for $x_p$ and 0 to 3 for $y_p$. The processing element address offset is programmable by the processing element 32 to select the (x,y) position from the 128 values available in the panel. The processing element component has a range 0, 2...30 in increments of 2 for $x_o$ and 0,4,...28 in increments of 4 for $y_o$. This expansion of the linear expression to these different components allows for the generation of only a small number of values to simultaneously compute a large volume of flexibly selected linear evaluations.

Three types of linear expressions may be evaluated by the image generation system. These expressions are ABC (or full), with all coefficients defined; AC, with the B coefficient computed by the linear expression evaluator; and C-Only, where only the C coefficient is defined. This may be 2 or 4 bytes in length. The linear expressions are evaluated using the LEE input machine 140, the LEE front end 142, the global LEE buses, the Global and Panel Buses, the LEE panel adders 144 and the processing elements 32.

The LEE Input Machine 140 formats the input data stream for input to the LEE Front End 142. The LEE Front End 142 generates the base region expressions (the $(Ax_r+By_r+C)$ portion of the linear expression) and X offset intermediate values. The data generated by the LEE Front End 142 is used by all processing elements 32. The Global LEE buses distribute the LEE Front End 142 generated intermediate values to the LEE Panel Adders 144 at each panel. The Global and Panel buses distribute the LEE Front End 142 generated X offsets (2A, 4A, etc. . .) (for ABC and AC expressions) or the entire expression (for C-only expressions) to each processing element 32. The LEE Panel Adders 144 (one per panel) add the panel offsets (the $(Ax_p+By_p)$ portion of the linear expression) to the base region expressions, and generate intermediate Y offset values. The data generated by each LEE panel adder 144 is used by all processing elements 32 in that panel 35. The Panel LEE buses distribute the panel localized expression base values and the Y offset to each processing element 35.

Finally, the processing elements 32 select and sum the appropriate base region expression, and X and Y offset intermediate values for their assigned pixel offset (the $(Ax_o+By_o)$ portion of the linear expression). The processing elements 32 generate the final x portion of the linear expression by selecting the proper x-offset from the data on the Panel Bus. The y portion is generated by selecting the proper y-offset from the Panel Buses.

The LEE input machine 140 and LEE front end 142 are common to all panels 35 in the processing element array 30. The panel adders 144 are uniquely provided for each panel 35.

The LEE front end 142 is a multiply tree that generates the various components of the linear expression. The inputs to the LEE front end 142 are the formatted coefficients from the LEE input machine 140, immediate data and control signals from the Micro-Sequencer 200 and region base addresses $(x_r, y_r)$ from the mCPU Bus 226. The values generated by the LEE front end 142 are placed on either the LEE1 bus 146, the LEE2 bus 148, or global/panel buses 21 and 43. The values placed on the LEE1 and LEE2 buses 146 and 148 are added to either 0, B, 2B or 3B by the panel adders 144 to generate the panel portion of the expanded linear expression. The processing elements 32 will use these values to generate each final LEE result in a multiple step process.

Figure 18:
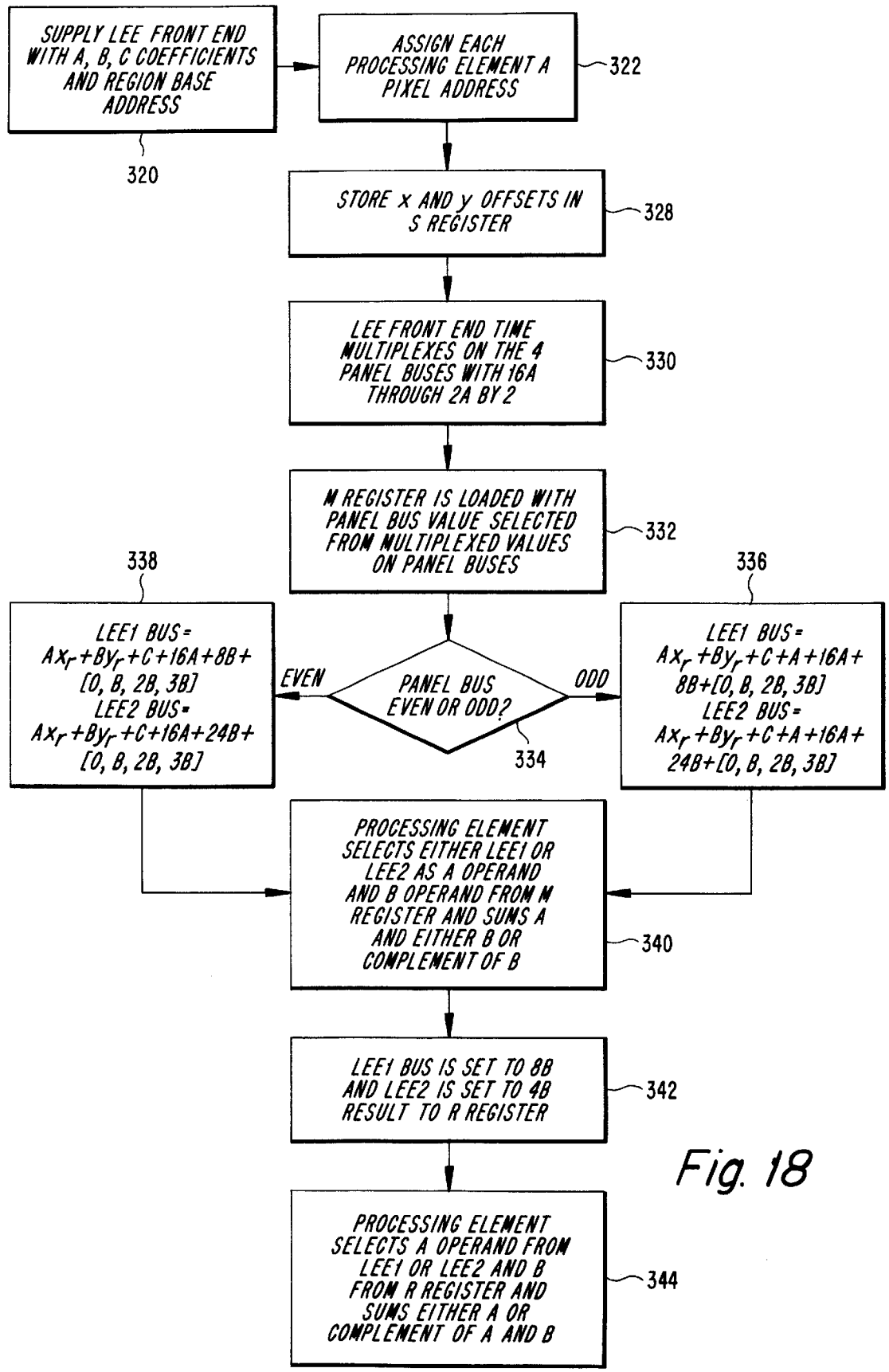
FIG. 18 is a flowchart describing the operation of a linear expression evaluator according to the image generation system of FIG. 1.

The LEE operation is illustrated in the flow chart of FIG. 18 and is defined as follows:

First the LEE front end 142 is supplied with the (A, B, C) coefficients and the region base address as illustrated in block 320. Each processing element 32 is assigned a pixel address with the format:

y1 y0 x2 x1 x0 y2 x3;

where y2 y1 y0 is the y offset and x3 x2 x1 x0 is the x offset. This operation is shown in block 322.

The x and y offsets values are stored in the ALU's 33 S register 252 (described below with reference to FIG. 19) to be used with the special operand selectors to conditionally select the LEE1, LEE2 and M register 254 (described below with reference to FIG. 19) inputs as seen in block 328.

The LEE front end 142 loads the panel buses 43 0 through 3 with the values (16A, 14A, . . . 2A) respectively as seen in block 330. The M register 254 is loaded with the panel bus value selected from the time multiplexed values placed on the Panel Buses through the Global Bus. These operations are reflected in block 332.

The LEE1 bus 146 is loaded with the $Ax_r+By_r+C+16A+8B+[O, B, 2B, 3B]$ and the LEE2 bus 148 is loaded with $Ax_r+By_r+C+16A+24B+[O, B. 2B, 3B]$ for even numbered panels. For odd numbered panels The LEE1 bus 146 is loaded with the $Ax_r+By_r+C+A+16A+8B+[O, B, 2B, 3B]$ and the LEE2 bus 148 is loaded with $Ax_r+BY_r+C+A+16A+24B+[O, B, 2B, 3B]$. These operation are reflected in blocks 334, 336 and 338.

The values of these equations provide the region and panel components of the linear expression. The 16A+8B and 16A+24B components provide the base values for computing the processing element 32 specific components of the linear expression.

Next, the ALU 33 of a processing element 32 executes the instruction that selects the A operand to be either LEE1 or LEE2 based on y2. The ALU selects the B operand to be either the M register 254 value or the complement of the M register 254 value if x3 is zero. The B operand is set to zero if x3 through x0 is equal to 1000. The ALU then adds the A and B operands. The result of this operation is placed in the R register. This operation is illustrated in block 340.

As shown in block 342, the LEE front end 142 loads LEE1 bus 146 with 8B and the LEE2 bus 148 with 4B. The ALU 33 of a processing element 32 executes the instruction that selects the A operand to be either LEE1 or LEE2 based on the bit 5 of the S register 252. If S6 is cleared, then operand A will be complemented. Also, if S6S5 is equal to 10, then A is zeroed. The B operand is selected to be the R register 250 and the A or complement of A and B operands are added as shown in block 344. This completes the linear expression evaluation for a given processing element 32.

Figure 19:
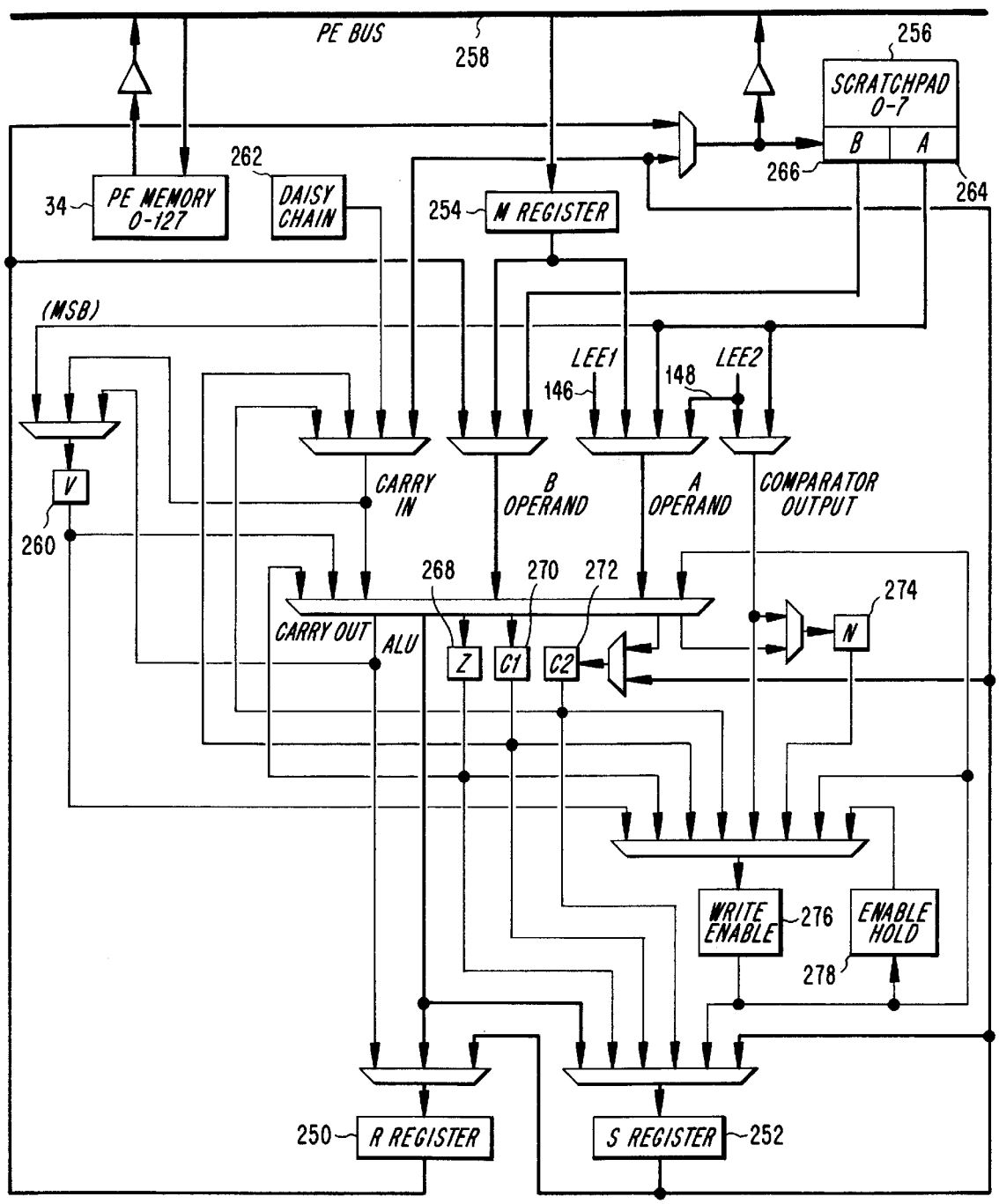
FIG. 19 is a block diagram of a processing element according to the image generation system of FIG. 1.

A preferred embodiment of the processing element 32 and its interconnection to the other processing elements will now be described. FIG. 19 shows one processing element 32 of the processing array 30. In FIG. 19, each thick line represents a data path that is 8 bits wide and each thin line represents a data path that is one bit wide.

The major components of the PE 32 are an 8-bit ALU 33, two 8-bit output registers (the R register 250 and the S register 252), an 8-byte scratchpad memory 256, an 8-bit PE bus 258, an 8-bit M input register 254, and a 128-byte memory 34.

During each clock cycle the ALU 33 accepts as its inputs an 8-bit A operand, an 8 bit B operand, a one-bit carry input, and several status bits. The ALU 33 calculates an 8-bit sum, difference, or bitwise logical function of the A and B operands and new values that the microinstruction may choose to load into the status bit registers. The microinstruction may specify either the M register 254 or the scratchpad memory 256 as the source for either the A or B operand. Alternatively, the microinstruction may specify either of the two 8-bit LEE buses (LEE1 146 or LEE2 148) as the source for the A operand, or the R register 250 as the source for the B operand. In addition, certain ALU operations that implement multiplication and division steps require that the A operand be from the scratchpad 256 and rotate it left one bit position through the status bit V 260. The microinstruction may also specify that certain A and/or B operands be either complemented or set to zero as a function of the contents of the S register 252 and the daisy chain flip-flop 262 for this PE 32. An additional circuit calculates a carry input for sum and difference ALU operations from the S register 252, the status bits, and the daisy chain flip-flop 262.

The microinstruction may load either the R register 250, the S register 252, or both of these registers with the 8-bit ALU 33 output. Alternatively, it may treat the ALU 33 output as the high order 8 bits and the contents of the S register 252 as the low order 8 bits of a 16-bit value and load both the R 250 and S 252 registers with this value rotated right two bit positions. Various ALU 33 operations that load both the R 250 and S 252 registers in this way may override the value of the high order two bits of either or both bytes of the shifted result with other values before loading the R and S registers 250 and 252.

The scratchpad 256 is an 8-byte dual ported addressable memory. A single microinstruction can specify three independent scratchpad addresses: one for reading an operand through the A port 264, one for reading an operand through the B port 266, and one for writing a result from the R 250 or S 252 register through the B port 266.

The status bits that can affect the ALU result are an overflow bit V 260, a zero bit Z 268 that is one if and only if the ALU output was zero when it was last registered, two carry bits C1 270 and C2 272, a negative bit N 274 that the microinstruction may set to either the sign bit of the ALU 33 output or the output of a comparator circuit that compares the LEE2 bus 148 value with the A scratchpad 264 input, a write enable bit 276 for both the 128-byte memory 34 and the scratchpad memory 256, and an enable hold bit 278 that serves as a one-level stack for the enable bit.

Figure 20:
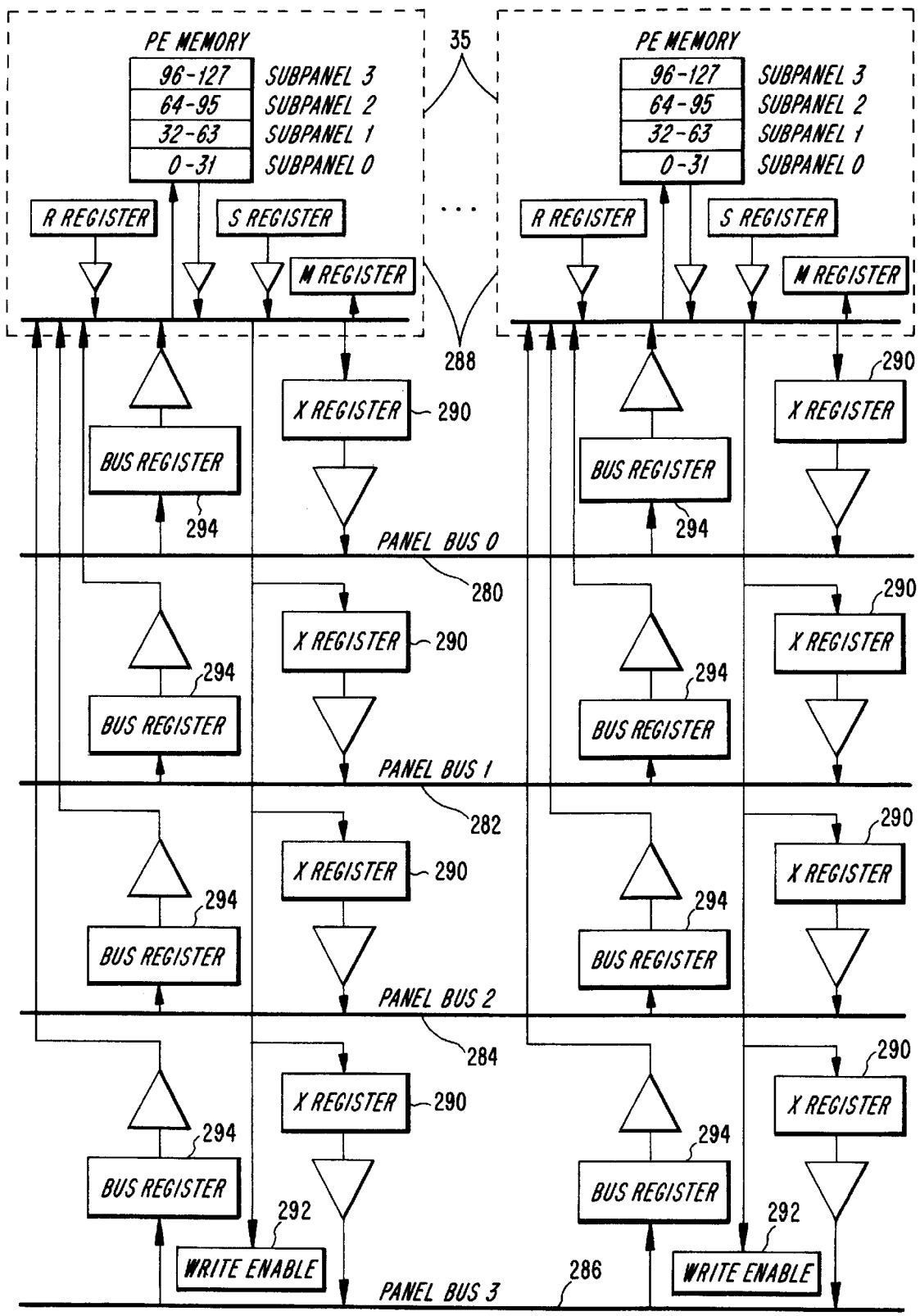
FIG. 20 is a block diagram illustrating the Panel Bus interconnection for one panel in one embodiment of the image generation system of FIG. 1.

The PE bus 258 provides an interface to the PE memory 34, a source for loading the M register 254, and a communication path between the PE 32 and other components of the chip through 4 panel buses 280, 282, 284, and 286. FIG. 20 shows the four 8-bit panel buses 280, 282, 284, and 286 that interconnect the thirty-two processing elements 32 within a panel. To prepare to transmit data to other processing elements 32 in its panel 35, each processing element 32 with data to transmit loads one or more of the 4 transmit (X) registers 290 to which it has access through its PE bus 258, and it loads its 4-bit write enable register 292 with a mask that enables the appropriate X registers 290 to drive their associated panel buses 280, 282, 284, and 286. The transmitting processing elements 32 must load each of the transmit registers 290 and the write enable register 292 during separate cycles because each of these operations transfers data across the PE buses 258.

During a subsequent cycle when each receiving processing element 32 enables the appropriate one of the 4 bus registers 294 to which it has access to receive data from its panel bus 280, 282, 284, and 286, the microinstruction instructs the enabled X registers 290 to drive the associated panel buses 280, 282, 284, and 286. For such a transfer to be meaningful, only one processing element 32 should enable an X register 290 to drive any panel bus 280, 282, 284, and 286, but any number of processing elements 32 (possibly including the transmitting PE 32 itself) may simultaneously load their bus registers 294 with data from a single panel bus 280, 282, 284, or 286. Finally, each receiving processing element 32 reads the transferred data from each relevant bus register through its PE bus 258 during subsequent cycles (one for each bus register read).

The transmitting processing elements 32 may send data to the X registers 290 either from their R 250 or S 252 registers or directly from memory 34. Similarly, the receiving processing elements 32 may receive data either in their M registers 254 or directly into memory 34. The direct connection to memory 34 for transmitting and/or receiving frees the processing elements 32 both to transfer data over the panel buses 280, 282, 284, and 286 and to perform a calculation not necessarily related to the transfer during the same cycle. The addressing logic for the 4 panel buses 280, 282, 284, and 286 facilitates the transfer of data up to 4 bytes in width between the processing elements 32 in the panel 35.

Normally, whenever a processing element 32 loads a transmit register 290 from its PE bus 258 or a bus register 294 from a panel bus 280, 282, 284, and 286, it addresses the register directly. In this register addressing mode, the low order two bits of the PE memory address specify the number of the panel bus that connects to the register. If the low order two bits of the memory address of Byte 0 (the low order byte) of a 32-bit number are the same in both the transmitting and receiving processing elements 32, the panel bus transfer will preserve the byte order of the 32-bit number. If the low order two bits of the memory addresses are not the same, the panel bus transfer will rotate the bytes.

A PE 32 can also address the X registers 290 and bus registers 294 indirectly. In this addressing mode, the low order two bits of a processing elements 32 S register 252, rather than the low order two bits of the memory address, specify the number of the panel bus 280, 282, 284, or 286 that connects to the register.

Figure 21:
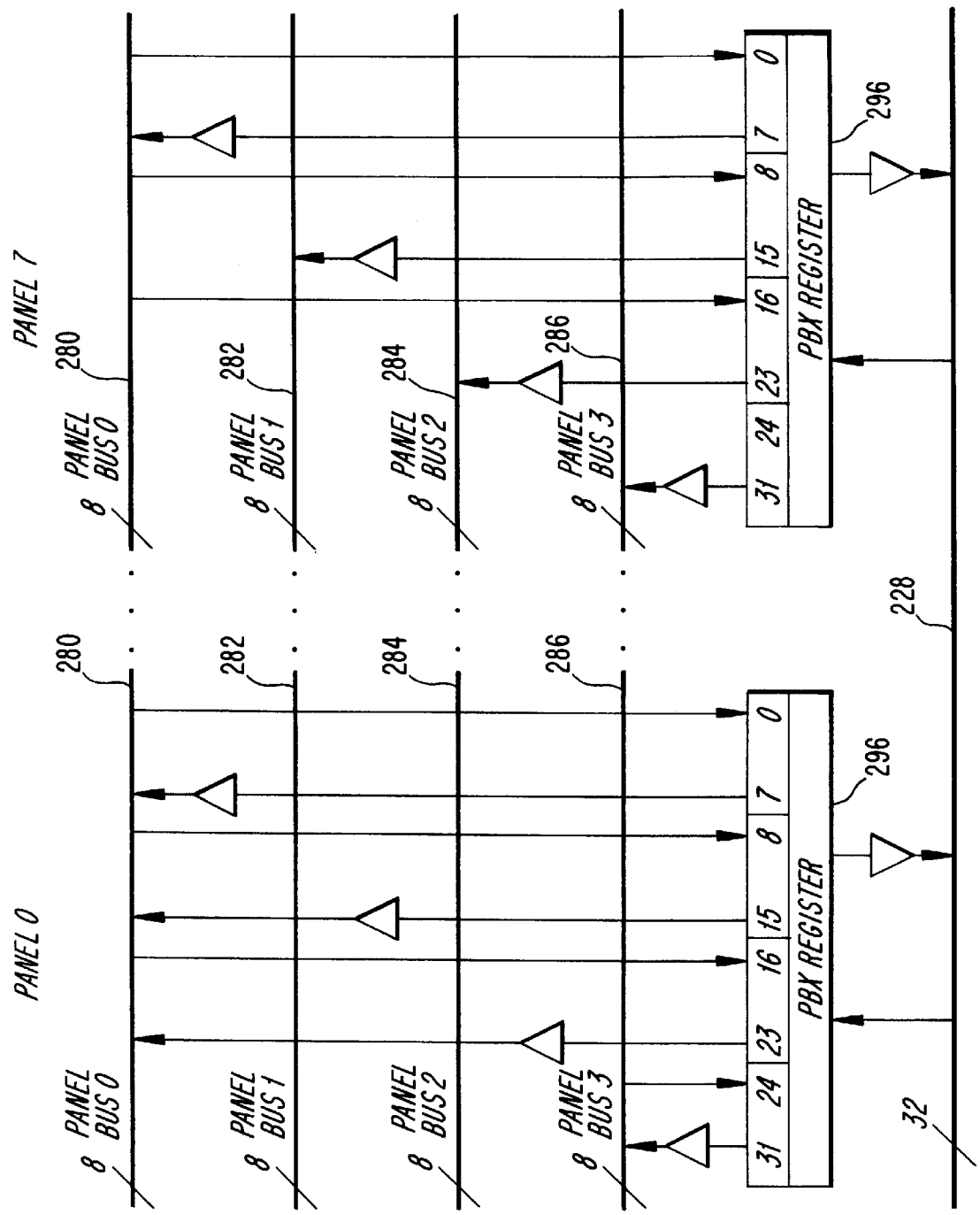
FIG. 21 is a block diagram of the Panel Bus and Global Bus interface of one embodiment of the image generation system of FIG. 1.

The 4 panel buses 280, 282, 284, and 286 also interface to a 32-bit global bus 228 that allows the processing elements 32 in each panel 35 to transfer data to and from other panels and the DBC 222 and to receive the X coordinate data from the LEE 36. FIG. 21 shows this interface. The microprogram may load any or all of the 4 byte positions in the set of eight 32-bit PBX registers 296 by driving one panel bus 280, 282, 284, or 286 for each byte position from any panel 35. The PBX 296 will then automatically drive the newly loaded bytes onto the global bus 228 during the next cycle.

Each panel bus 280, 282, 284, and 286, as well as each byte of the global bus 228, transfers an additional bit to its 8 data bits that describes whether the byte is valid. Data for a byte is valid during any given cycle if and only if a source drives data for that byte during the cycle. The PBX register 296 retains these validity bits whenever the microprogram loads it and avoids driving any byte that is invalid during the next cycle. These validity bits are also placed on the global bus 228 to indicate that a byte of the 32 bit global bus 228 contains valid data.

The panel buses 280, 282, 284, and 286, and the global bus 228 may also be operated in an asynchronous mode if access to the Bus Register 294 and X register 290 is not required by the processing elements. In the asynchronous mode data may be written to or read from these registers to or from the global bus. This asynchronous mode may be utilized to carry out input/output functions while the processing elements do not require use of the B register 294 and the X register 290.

During a cycle when the microprogram requests data from the DBC 222 or X coordinate data from the LEE 36, the selected data source writes its data to the appropriate bytes of the global bus 228. Then, during the next cycle, each PBX register 296 drives each panel bus 280, 282, 284, and 286 for which it has valid data and the microprogram instructs each PE 32 in each panel 35 to read the appropriate bytes into its bus registers 294.

The indirect addressing feature of the X registers 290 and bus registers 294 is particularly useful for transferring pixel data to and from a frame buffer 24 via the DBC 222. In such a transfer, the thirty-two processing elements 32 in each panel 35 should distribute the thirty-two bytes that they produce across the 4 panel buses 280, 282, 284, and 286 so that they may transmit the resulting data to the DBC 222 via the global bus 228 in the minimum number of cycles (8). The indirect addressing feature allows the four processing elements 32 that produce each 32-bit global bus word to each address an X register 290 for a different panel bus 280, 282, 284, or 286.

To access processing element memory 34, the microprogram instructs the sequencer 200 to produce a 7-bit address during each cycle that involves such a memory access by either extracting the address as an immediate operand from the microinstruction itself, or by selecting a 7-bit address from one of the address source registers in the sequencer 200. The processing elements 32 may then address their memories in any one of three modes:

1. Direct mode. The micro sequencer 200 optionally complements the high order bit of the 7-bit address (depending on the microinstruction and the contents of a register loaded during a previous cycle) and accesses its memory at the resulting address;
2. Indirect 2 mode. Each PE 32 replaces the high order bit (Bit 6) of the 7-bit address with Bit 0 of its S register and accesses its memory at the resulting address; or
3. Indirect 4 mode. Each PE 32 replaces the high order two bits (Bits 6 and 5) of the 7-bit address with Bits 1 and 0 of its S register, and then accesses memory at the resulting address.

The indirect modes for addressing memory are independent of the indirect mode for specifying which X registers 290 and bus registers 294 to load. The low order two bits of the S register 252 determine which section of memory the indirect modes allow the PE 32 to address. In direct mode all 128 bytes of memory are addressable. In Indirect 2 mode bit 0 of the S register 252 set to 0 addresses the first 64 bytes of memory 34 and bit 0 set to 1 addresses the last 64 bytes. In Indirect 4 mode, bits 0 and 1 of the S register 252 select the addressable segment of memory 34. When bits 0 and 1 of the S register 252 are set to 00, the first 32 bytes are addressable, 01, the second 32 bytes, 10 the third 32 bytes and 11 the fourth 32 bytes.

Figure 22A:
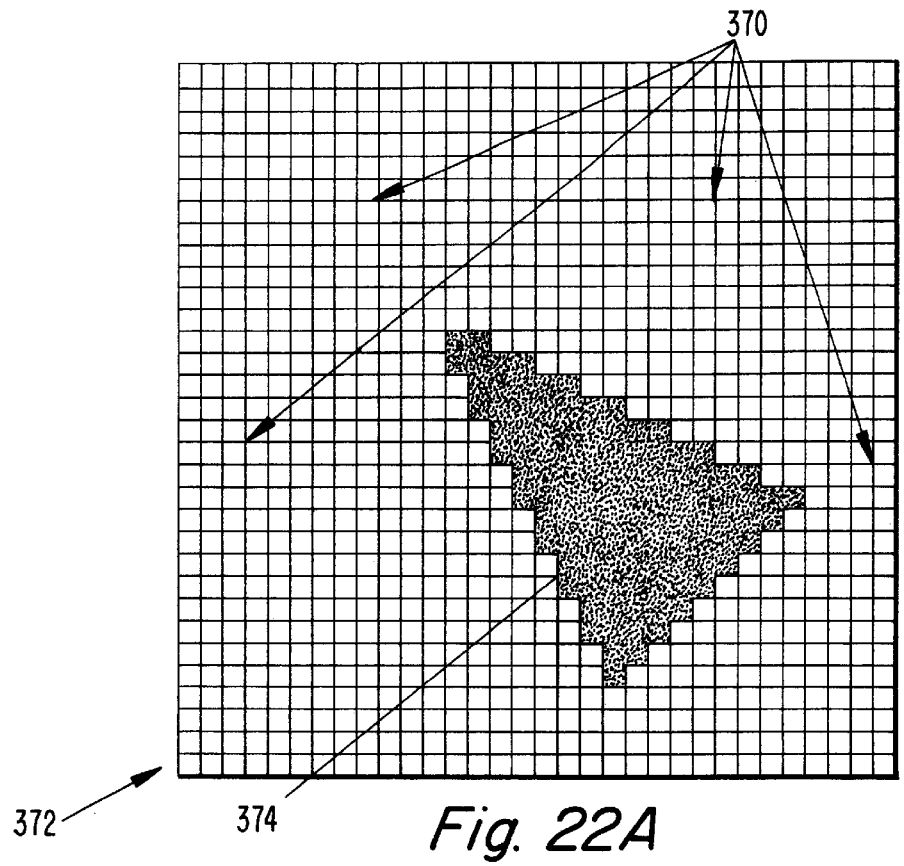
FIG. 22A is a diagram of a screen region having a polygon which intersects multiple screen sub-regions but is smaller than a sub-region.
Figure 22B:
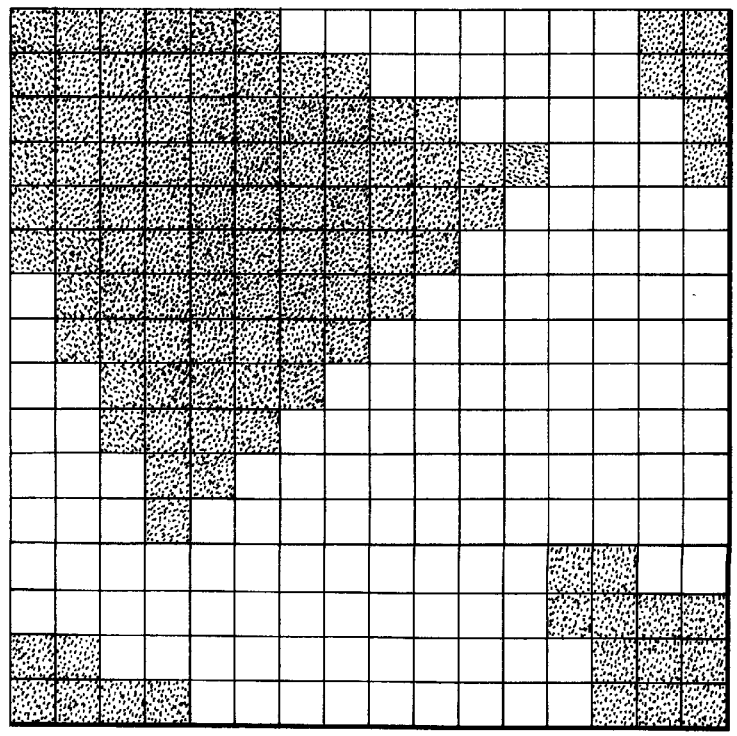
FIG. 22B is a diagram of the distribution of contributions to pixel elements in a panel according to the image generation system of FIG. 1 for the polygon of FIG. 22A.

The indirect PE memory addressing modes allow the various processing elements 32 to access different areas of memory during the same cycle, and support base-relative addressing, which may be useful for accessing one of several copies of data stored in the same format in different regions of memory. As an example that requires the various processing elements 32 to access different regions of memory 34, consider the processing of a polygon whose bounding rectangle both (1) has no side longer than the side of a subregion (16 pixels) and (2) is contained within one region. FIGS. 22A and 22B show such an example. FIG. 22A illustrates a polygon 374 which extends across four subregions 370 of a screen region 372. During pixel processing, each of the 4 areas of memory 34 that the processing elements 32 access in Indirect 4 mode contains the data for a pixel at the same coordinates relative to a different one of the 4 subregions within a region. One way to process all of the pixels in the polygon in the example of FIG. 22A would be to process one subregion at a time while disabling those processing elements 32 that do not support pixels within the polygon. This method would require 4 passes, one for each subregion that overlaps the window. A more efficient method would be to process all of the pixels from the various subregions simultaneously. By distributing the pixels within the polygon throughout the processing element array 30 as shown in FIG. 22B, the entire polygon may be processed simultaneously. The indirect 4 mode permits this approach by allowing the processing elements to access the 4 memory areas independently. This load balancing is made possible by the reprogrammability of the processing elements corresponding x and y screen coordinates.

As a second example that requires the various processing elements 32 to access different regions of memory, consider the distribution of the contributions of several polygons to a pixel over the processing elements 32 in a panel 35 to balance the load for processing these contributions. For purposes of load balancing, the microprogram partitions the memory 34 of the processing elements 32 into two sections for storing contribution data: a main section and an overflow section. The data needed to compute each contribution is then distributed from the processing element 32 that processes the pixel to the other processing elements 32, filling all of the main sections in each panel 35 before writing to any overflow sections in that panel 35. Contribution data continues to be distributed until either (1) all of the main sections in all panels are occupied, or (2) all of the overflow sections in some panel are occupied.

During this distribution process, those processing elements 32 in panels 35 that have all main sections occupied will write to their overflow sections while those processing elements 32 that do not have all main sections occupied will write to their main sections. The indirect 2 mode allows these two groups of processing elements 32 to write to different sections of memory 34 during the same cycle. Bit 0 of the S register 252 in each PE 32 that writes to its main section should be the high order bit of the main section address; Bit 0 of the S register 252 of each other PE 32 should be its complement.

Once the contributions are distributed, every PE 32 that has contribution data processes the contribution data in its main section and returns the result to the originating PE 32 using direct memory addressing. The main section then becomes available for reuse. The overflow section contains contribution data that has already been distributed. To avoid unnecessary copying of these data to the now free main section, the microprogram instructs the sequencer to load the register that inverts the high order bit of the PE memory address in direct mode. Then, the previous overflow section becomes the main section (usually with data already distributed to some processing elements 32), and the previous main section becomes the new overflow section.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

That which is claimed:

1. An image generation system for generating pixel values of a pixel array which corresponds to a group of geometric primitives which define a computer generated image, the image generation system comprising:

a plurality of processing elements for evaluating mathematical expressions which define said geometric primitives to generate a contribution value for pixels of said pixel array, wherein each of said plurality of processing elements corresponds to a specified pixel of said pixel array and wherein the specified pixel of a processing element in the plurality of processing elements is any pixel of said pixel array; and load balancing assignment means for dispersing the assignments of pixels to said processing elements of said plurality of processing elements to establish the correspondence of said specified pixels of said pixel array with said processing elements, wherein the dispersion of assignments of processing elements to said specified pixels disperses the assignments of adjacent processing elements among non-adjacent pixels.

2. An image generation system according to claim 1, wherein said load balancing assignment means associates a pixel of said pixel array with one of said plurality of processing elements for each of said primitives in said group of primitives.

3. An image generation system according to claim 1, wherein said mathematical expressions comprise linear expressions, said image generation system further comprising a linear expression evaluator operably associated with said plurality of processing elements for providing coefficients of said linear expressions to said plurality of processing elements.

4. An image generation system according to claim 1, wherein said mathematical expressions comprise linear expressions, said image generation system further comprising a linear expression evaluator operably associated with said plurality of processing elements for evaluating said linear expressions and providing the results of said evaluation to said plurality of processing elements.

5. An image generation system according to claim 4, wherein said load balancing assignment means further comprises means for associating regions of said pixel array to said plurality of processing elements and wherein said linear expression evaluator provides region specific coefficients to said plurality of processing elements.

6. An image generation system according to claim 5, wherein said plurality of processing elements is divided into a plurality of panels; and wherein said linear expression evaluator further provides panel specific coefficients to said processing elements of one of said panels.

7. An image generation system according to claim 5, wherein said plurality of processing elements is divided into a plurality of panels; and wherein said load balancing assignment means further comprises means for associating pixels of one of said regions to a respective one of said plurality of panels; and wherein said linear expression evaluator further provides panel specific coefficients to said processing elements of said respective one of said panel associated with said region.

8. An image generation system according to claim 7, wherein said regions are further divided into a plurality of subregions and wherein said load balancing assignment means further comprises means for assigning at least one pixel from each of said plurality of subregions to each of said processing elements.

9. An image generation system according to claim 7, wherein said linear expression evaluator evaluates the mathematical expression for a region base value for said regions and further provides said calculated region base value to said processing elements associated with said region.

10. A method of generating a computer image utilizing a plurality of processing elements in a processing element array, wherein the computer image defines a screen having a plurality of pixels and wherein the image displayed on the screen is defined by a plurality of geometric primitives, said method comprising the steps of:

assigning home pixel addresses to the processing elements of the processing array;

determining which home pixel addresses of the processing elements correspond to pixels of the screen which are inside a region defined by one of said geometric primitives which define the image such that a contribution value for the geometric primitive will result for the home pixels which are within the geometric primitives; and then distributing the contributions which said determining step determines correspond to home pixels for which a contribution value for the geometric primitive will result, to the processing elements of the processing element array such that each of the processing elements provides one contribution value for a home pixel based on the assigned contribution and wherein at least one contribution for a home pixel is assigned to a processing element other than the processing element associated with the home pixel of the at least one contribution.

11. The method of claim 10 wherein said determining and said distributing steps are repeated until one of a condition selected from a group comprising a condition of a contribution being distributed to each of the processing elements in the processing element array and a condition of at least one processing element in the processing element array being unable to accept a further contribution is satisfied.

12. The method of claim 10, further comprising the steps of:

determining the contribution values for each home pixel based upon the contributions; then returning the contribution values for each home pixel to the processing element associated with the home pixel; and then generating a final contribution value for each home pixel from the contribution values returned for the home pixel.

13. The method of claim 10, wherein said assigning step is followed by the step of discarding contributions if a contribution for a home pixel associated with a geometric primitive will be obscured by a nearer geometric primitive.

14. The method of claim 10 wherein said assigning step comprises assigning a plurality of home pixels to each of the processing elements such that the home pixels of each processing element correspond to non-adjacent pixels of the screen.

15. The method of claim 10 wherein said assigning step is followed by the step of determining texturing contribution values for the contributions.

16. An apparatus for generating a computer image wherein the computer image defines a screen having a plurality of pixels and wherein the image displayed on the screen is defined by a plurality of geometric primitives comprising:

a plurality of processing elements in a processing element array, means for assigning home pixel addresses to said processing elements of said processing array;

means for determining which home pixel addresses of the processing elements correspond to pixels of the screen which are inside a region defined by one of said geometric primitives which define the image such that a contribution value for the geometric primitive will result for the home pixels within said geometric primitives; and means for distributing the contributions which said means for determining determines correspond to home pixels for which a contribution value for the geometric primitive will result to the processing elements of the processing element array such that each of the processing elements provides one contribution value for a home pixel based on the assigned contribution and wherein at least one contribution for a home pixel is assigned to a processing element other than the processing element associated with the home pixel of the at least one contribution.

17. The apparatus of claim 16 wherein said means for determining and said means for distributing steps further comprise means for repeatedly determining which home pixel addresses of the processing elements correspond to pixels of the screen which are inside a region defined by a geometric primitive which define the image such that a contribution value for the geometric primitive will result for the home pixels within said geometric primitives and distributing the contributions which said determining step determines correspond to home pixels for which a contribution value for the geometric primitive will result to the processing elements of the processing element array such that each of the processing elements provides one contribution value for a home pixel based on the assigned contribution until one of the conditions selected from the group comprising the condition of a geometric primitive being distributed to each of the processing elements in the processing element array and the condition of at least one processing element in the processing element array being unable to accept a further primitive is satisfied.

18. The apparatus of claim 16, further comprising:

means for determining the contribution values for each home pixel based upon said contributions;

means for returning the contribution values for each home pixel to the processing element associated with the home pixel; and means for generating a final contribution value for each home pixel from the contribution values returned for the home pixel.

19. The apparatus of claim 16, further comprising means for discarding contributions if a contribution for a home pixel associated with a geometric primitive will be obscured by a nearer geometric primitive.

20. The apparatus of claim 16 wherein said means for assigning comprises means for assigning a plurality of home pixels to each of said processing elements such that the home pixels of any specific processing element correspond to non-adjacent pixels of the screen.

21. The apparatus of claim 16 further comprising means for determining texturing contribution values for the home pixels.

22. A computer program product for generating a computer image utilizing a plurality of processing elements in a processing element array, wherein the computer image defines a screen having a plurality of pixels and wherein the image displayed on the screen is defined by a plurality of geometric primitives comprising:

A computer-readable storage medium having computer-readable program code means embodied in said medium, said computer-readable program code means comprising:

computer readable program code means for assigning home pixel addresses to said processing elements of said processing array;

computer readable program code means for determining which home pixel addresses of the processing elements correspond to pixels of the screen which are inside a region defined by one of said geometric primitives which define the image such that a contribution value for the geometric primitive will result for the home pixels within said geometric primitives; and computer readable program code means for distributing the contributions which said computer readable program code means for determining determines correspond to home pixels for which a contribution value for the geometric primitive will result to the processing elements of the processing element array such that each of the processing elements provides one contribution value for a home pixel based on the assigned contribution and wherein at least one contribution for a home pixel is assigned to a processing element other than the processing element associated with the home pixel of the at least one contribution.

23. The computer program product of claim 22 wherein said computer readable program code means for determining and said computer readable program code means for distributing steps further comprise computer readable program code means for repeatedly determining which home pixel addresses of the processing elements correspond to pixels of the screen which are inside a region defined by a geometric primitive which define the image such that a contribution value for the geometric primitive will result for the home pixels within said geometric primitives and distributing the contributions which said computer readable program code means for determining determines correspond to home pixels for which a contribution value for the geometric primitive will result to the processing elements of the processing element array such that each of the processing elements provides one contribution value for a home pixel based on the assigned contribution until one of the conditions selected from the group comprising the condition of a geometric primitive being distributed to each of the processing elements in the processing element array and the condition of at least one processing element in the processing element array being unable to accept a further primitive is satisfied.

24. The computer program product of claim 22, further comprising:

computer readable program code means for determining the contribution values for each home pixel based upon said contributions;

computer readable program code means for returning the contribution values for each home pixel to the processing element associated with the home pixel; and computer readable program code means for generating a final contribution value for each home pixel from the contribution values returned for the home pixel.

25. The computer program product of claim 22, further comprising computer readable program code means for discarding contributions if a contribution value for a home pixel associated with a geometric primitive will be obscured by a nearer geometric primitive.

26. The computer program product of claim 22 wherein said computer readable program code means for assigning comprises computer readable program code means for assigning a plurality of home pixels to each of said processing elements such that the home pixels of any specific processing element correspond to non-adjacent pixels of the screen.

27. The computer program product of claim 22 further comprising computer readable program code means for determining texturing contribution values for the home pixels.

28. A method of generating pixel values of a pixel array utilizing a plurality of processing elements in a processing element array, wherein the pixel array corresponds to a group of geometric primitives which define a computer generated image, the method comprising the steps of:

evaluation mathematical expressions which define said geometric primitives to generate a contribution value for pixels of said pixel array, wherein each processing element of the plurality of processing elements corresponds to a specified pixel of said pixel array and wherein the specified pixel of a processing element in the plurality of processing elements is any pixel of said pixel array; and dispersing the assignments of pixels to said processing elements of said plurality of processing elements to establish the correspondence of said specified pixels of said pixel array with said processing elements, wherein the dispersion of assignments of processing elements to said specified pixels disperses the assignments of adjacent processing elements among non-adjacent pixels.

* * * * *